US012775942B2

(12) United States Patent
Chiapuzio

(10) Patent No.: US 12,775,942 B2
(45) Date of Patent: Oct. 27, 2026

(54) INTERCHAIN MANAGEMENT OF DIGITAL ASSETS

(71) Applicant: Frontage Road Holdings, LLC, Wilmington, DE (US)

(72) Inventor: Raymond A. Chiapuzio, Eugene, OR (US)

(73) Assignee: FRONTAGE ROAD HOLDINGS, LLC, Wilmington, DE (US)

( * ) Notice: Subject to any disclaimer, the term of this patent is extended or adjusted under 35 U.S.C. 154(b) by 140 days.

(21) Appl. No.: 18/421,273

(22) Filed: Jan. 24, 2024

(65) Prior Publication Data

US 2024/0257116 A1 Aug. 1, 2024

Related U.S. Application Data

(60) Provisional application No. 63/441,075, filed on Jan. 25, 2023.

(51) Int. Cl.
*G06Q 20/38* (2012.01)

(52) U.S. Cl.
CPC ................................ *G06Q 20/3829* (2013.01)

(58) Field of Classification Search
CPC ............. G06Q 20/3829; G06Q 20/123; G06Q 20/0655
See application file for complete search history.

(56) References Cited

U.S. PATENT DOCUMENTS 10,489,757 B2 11/2019 Melika et al.
10,505,726 B1 12/2019 Andon et al.
(Continued)

FOREIGN PATENT DOCUMENTS

WO 2017/131929 A1 8/2017
WO 2019/194803 A1 10/2019
(Continued)

OTHER PUBLICATIONS

"Dada Protocol White paper", AI tool to empower everyone create beautiful world, Vison2.0, May 2021, 8 pages.
(Continued)

*Primary Examiner* — Jalatee Worjloh
(74) *Attorney, Agent, or Firm* — Hamilton, Brook, Smith & Reynolds, P.C.

(57) ABSTRACT

A computer-based system, computer-implemented method, and computer program product for multinetwork digital asset control leverage a multinetwork digital asset control system implemented upon one or more computer networks. Disparity(ies) between two or more computer networks of a plurality of computer networks are resolved based on metadata and/or rules. A digital asset is controlled across the networks. Respective clones of the digital asset are instantiated on respective networks of the networks. A cryptographic key secures the digital asset and the respective clones. An access request by a second node of a second network of the networks is validated by transferring the key to the second node. The access request is for the digital asset or a clone of the respective clones. Responsive to the transferring, access to clones of the respective clones is preempted. The clones are instantiated on networks of the plurality of networks different from the second network.

28 Claims, 13 Drawing Sheets

100

(56) References Cited

U.S. PATENT DOCUMENTS

| | | | | |
|---|---|---|---|---|
| 10,540,653 | B1 | 1/2020 | James et al. | |
| 10,581,847 | B1 | 3/2020 | Sun et al. | |
| 10,915,874 | B2 | 2/2021 | Code et al. | |
| 10,951,409 | B2 | 3/2021 | Konda et al. | |
| 11,075,891 | B1 | 7/2021 | Long et al. | |
| 2017/0178237 | A1 | 6/2017 | Wong | |
| 2017/0213289 | A1 | 7/2017 | Doney | |
| 2017/0243289 | A1 | 8/2017 | Rufo | |
| 2018/0288022 | A1 | 10/2018 | Madisetti et al. | |
| 2019/0205881 | A1 | 7/2019 | Borzilleri et al. | |
| 2019/0220852 | A1 | 7/2019 | Black et al. | |
| 2019/0244207 | A1 | 8/2019 | Samuel | |
| 2019/0251199 | A1 | 8/2019 | Klianev | |
| 2019/0318328 | A1 | 10/2019 | Castinado et al. | |
| 2019/0386968 | A1 | 12/2019 | Good et al. | |
| 2020/0005254 | A1 | 1/2020 | Wright et al. | |
| 2020/0005282 | A1 | 1/2020 | Kim | |
| 2020/0044863 | A1 | 2/2020 | Yadlin et al. | |
| 2020/0159890 | A1 | 5/2020 | Chui et al. | |
| 2020/0219093 | A1 | 7/2020 | Malhotra et al. | |
| 2020/0250752 | A1 | 8/2020 | Sugarman | |
| 2020/0258159 | A1 | 8/2020 | Stradling et al. | |
| 2020/0334752 | A1 | 10/2020 | Doney et al. | |
| 2020/0342539 | A1 | 10/2020 | Doney | |
| 2021/0083872 | A1 | 3/2021 | Desmarais et al. | |
| 2021/0097528 | A1 | 4/2021 | Wang | |
| 2021/0133700 | A1 | 5/2021 | Williams et al. | |
| 2021/0133708 | A1 | 5/2021 | Robertson et al. | |
| 2021/0142318 | A1 | 5/2021 | Qian et al. | |
| 2021/0150626 | A1 | 5/2021 | Robotham | |
| 2021/0158444 | A1 | 5/2021 | Di Nicola et al. | |
| 2021/0248594 | A1 | 8/2021 | Yantis et al. | |
| 2021/0256070 | A1 | 8/2021 | Tran et al. | |
| 2021/0326854 | A1 | 10/2021 | Yantis et al. | |
| 2021/0326862 | A1 | 10/2021 | Yantis et al. | |
| 2021/0327216 | A1 | 10/2021 | Naramore et al. | |
| 2021/0383334 | A1 | 12/2021 | Krasnyansky | |
| 2021/0383363 | A1 | 12/2021 | Smirnov | |
| 2022/0021728 | A1* | 1/2022 | Kelly | G06F 21/6245 |
| 2022/0058282 | A1 | 2/2022 | Ricotta, Jr. et al. | |
| 2022/0076219 | A1 | 3/2022 | Filter et al. | |
| 2022/0084013 | A1 | 3/2022 | Kulkarni et al. | |
| 2022/0085989 | A1* | 3/2022 | Yadlin | H04L 9/085 |
| 2022/0188810 | A1 | 6/2022 | Doney | |
| 2022/0230147 | A1 | 7/2022 | Wright et al. | |
| 2023/0177496 | A1* | 6/2023 | Le Van Gong | G06Q 20/3829 |
| 2023/0412393 | A1 | 12/2023 | Josh et al. | |
| 2023/0419274 | A1 | 12/2023 | Josh et al. | |
| 2023/0419285 | A1 | 12/2023 | Josh et al. | |
| 2024/0185191 | A1* | 6/2024 | Bernardi | H04L 9/50 |
| 2024/0249289 | A1 | 7/2024 | Chiapuzio | |
| 2024/0370854 | A1 | 11/2024 | Williams et al. | |
| 2024/0412207 | A1 | 12/2024 | Williams et al. | |
| 2025/0156828 | A1* | 5/2025 | Sliwka | G06Q 20/02 |

FOREIGN PATENT DOCUMENTS

| | | | | |
|---|---|---|---|---|
| WO | 2019/213700 | A1 | 11/2019 | |
| WO | WO-2021061724 | A1 * | 4/2021 | G06Q 20/3829 |
| WO | 2021/211292 | A1 | 10/2021 | |
| WO | 2022/102818 | A1 | 5/2022 | |
| WO | 2022/245929 | A1 | 11/2022 | |
| WO | 2023/245182 | A1 | 12/2023 | |
| WO | 2023/245196 | A1 | 12/2023 | |
| WO | 2023/245199 | A1 | 12/2023 | |
| WO | 2024/145513 | A1 | 7/2024 | |
| WO | 2024/158669 | A1 | 8/2024 | |
| WO | 2024/158879 | A1 | 8/2024 | |
| WO | 2024/233317 | A1 | 11/2024 | |

OTHER PUBLICATIONS

Cayo, F. S., et al., “Blockchain scalability for smart contract systems using eUTXO model”, IEEE, IOTJ, XX, No. X, Jan. 2022, 9 pages.

Dr. F., “B.Amm—Efficient Automated Market Maker for DeFi Liquidations”, Jun. 2021.

Harvey, C. R., et al., “DeFi and the Future of Finance”, John Wiley & Sons, Aug. 2021, 208 pages.

Karapapas, C., et al., “Fully Decentralized Trading Games with Evolvable Characters using NFTs and IPFS”, IFIP Networking Conference (IFIP Networking), May 28, 2021, 3 pages.

Lindell, Y., et al., “Secure multiparty computation”, Communications of the AMC, 2020, pp. 86-96.

Liu, F., et al., “A Blockchain-Based Digital Asset Platform with Multi-Party Certification”, Applied Sciences, vol. 12, No. 11, 2022, 16 pages.

Longo, R., et al., “Threshold Multi-Signature with an Online Recovery Party”, Jan. 7, 2020, 31 pages.

Ngo, R., et al., “First Fully Decentralized AMM based Money Market Protocol”, Oct. 21, 2021, 15 pages.

Nicola, V. D., et al., “Resilient Custody of Crypto-Assets, and Threshold Multisignatures”, Mathematics, vol. 8, 2020, No. 1773, 17 pages.

Popescu, A.D., “Non-Fungible Tokens (NFT)—Innovation beyond the craze”, 5th International Conference on Innovation in Business, Economics & Marketing research (IBEM—2021) Proceedings of Engineering & Technology—PET—vol. 66 , 2021, 6 pages.

Salleras, X., et al., “ZPiE: Zero-Knowledge Proofs in Embedded Systems”, Mathematics , vol. 9, No. 20, Oct. 13, 2021, 17 pages.

Unruh, D., “Non-Interactive Zero-Knowledge Proofs in the Quantum Random Oracle Model”, University of Tartu, International Association for Cryptologic Research 2015, Eurocrypt 2015, Part II, LNCS 9057, pp. 755-784.

Unruh, D., et al., “Non-Interactive Zero-Knowledge Proofs in the Quantum Random Oracle Model”, Lecture Notes in Computer Science book series, vol. 9057, Jan. 2015, 30 pages.

Wang, et al., “Non-Fungible Token (NFT): Overview Evaluation”, Opportunities and Challenges, Oct. 25, 2021.

Wang. Y., “Automated Market Makers for Decentralized Finance (DeFi)”, arXiv preprint arXiv:2009.01676, Sep. 3, 2020, 14 pages.

Warren, W., et al., “Ox An open protocol for decentralized exchange on the Ethereum blockchain”, Brave New Coin, URL: https://github.com/0xProject/whitepaper, 2017, pp. 4-18.

Wiener, F., “Secure Multiparty Computation (MPC) for Digital Asset Custody Wallets”, URL: https://sepior.com/blog/secure-multiparty-computation-mpc-for-digital-asset-custody-wallets, Feb. 9, 2021, 13 pages.

Xu, Z., et al., “An Efficient Supply Chain Architecture Based on Blockchain for High-value Commodities”, BSCI ’19: Proceedings of the 2019 ACM International Symposium on Blockchain and Secure Critical Infrastructure, Jul. 2019, 9 pages.

International Search Report and Written Opinion received for PCT Patent Application No. PCT/US2024/012724, mailed on Apr. 29, 2024, 13 pages.

* cited by examiner

INTERCHAIN MANAGEMENT OF DIGITAL ASSETS

RELATED APPLICATION

This application claims the benefit of U.S. Provisional Application No. 63/441,075, filed on Jan. 25, 2023. The entire teachings of the above application are incorporated herein by reference.

BACKGROUND

A blockchain may be implemented as a peer-to-peer (P2P), electronic ledger that is implemented as a computer-based decentralized, distributed system made up of blocks, which, in turn, are made up of transactions. Each transaction may be a data structure that encodes a transfer of control of a digital asset between participants in the blockchain system, and that includes at least one input and at least one output. Each block may contain a hash of a previous block so that blocks become chained together to create a permanent, unalterable record of all transactions that have been written to the blockchain since its inception. Transactions may contain small programs, known as scripts, embedded into their inputs and outputs; the scripts may specify how and by whom the outputs of the transactions can be accessed.

Blockchain may be used for implementation of "smart contracts" that can be associated with digital asset. These are computer programs designed to automate execution of terms of a machine-readable contract or agreement. Unlike a traditional contract, which would be written in natural language, a smart contract is a machine-executable program that may include rules for processing inputs to generate results; these results may then cause actions to be performed depending upon those results. With respect to commercial transactions, for example, these may involve a transfer of property rights and/or assets.

An area of blockchain-related interest is the use of "tokens" to represent and transfer assets via the blockchain. A token serves as an identifier that allows an asset to be referenced from the blockchain. Fungible tokens are uniform. In other words, fungible tokens of the same type are identical in specification, and each fungible token is identical to another fungible token of the same type. Fungible tokens may be divisible into smaller amounts. Similar to currency, where bills can be divided into coins of an equivalent value, fungible tokens may be divisible. Non-fungible tokens (NFTs), however, cannot be replaced with other tokens of the same type. NFTs represent non-fungible assets. Non-fungible assets have unique information or attributes. Each NFT is unique and differs from other tokens of the same class, and, unlike a fungible token, NFTs typically cannot be divided. Blockchain gaming systems may use tokens or NFTs to create different parts of the game, such as rules, characters, weapons, and skins.

Cryptocurrency wallets may be implemented to securely store and manage blockchain assets, tokens, NFTs, and cryptocurrencies. These wallets may allow users to spend, receive, and trade digital assets.

SUMMARY

Blockchain's rapid development has led to the existence of many different kinds of chains, and in turn given rise to cross-chain technology. Cross-chain, as its name suggests, allows the transmission of value and information between different blockchains. Within a single blockchain, a miner has visibility to all transactions on the single blockchain. However, the miner does not have visibility, for example, to pending transactions on another blockchain.

Embodiments thus provide innovations that can control or manage digital assets across multiple networks. Certain embodiments include features that leverage cross-chain techniques to enable control and tracking of a digital asset across multiple blockchain networks.

An example embodiment is directed to a computer-based system for multinetwork digital asset control. The system includes a plurality of computer networks or platforms. Each of the plurality of computer networks may have a respective plurality of nodes. A first node of a first computer network of the plurality of computer networks may be configured to execute a multinetwork digital asset control system. The multinetwork digital asset control system may be configured to resolve disparity(ies) between two or more computer networks of the plurality of computer networks based on metadata and/or rules, e.g., predefined rules. The multinetwork digital asset control system may be further configured to control or track a digital asset across the plurality of computer networks. Controlling the digital asset may include instantiating respective clones of the digital asset on respective computer networks of the plurality of computer networks. Controlling the digital asset may further include configuring or creating a cryptographic key to secure the digital asset and the instantiated respective clones. Controlling the digital asset may further include validating an access request by a second node, e.g., a client device or user, of a second computer network of the plurality of computer networks by transferring the cryptographic key to the second node. The access request may be for the digital asset or a clone of the instantiated respective clones. Controlling the digital asset may further include, responsive to the transferring, preempting access to clones of the instantiated respective clones. The clones may be instantiated on computer networks of the plurality of computer networks different from the second computer network. As such, all nodes that do not possess the cryptographic key may not have access to the digital asset, and an owner of the digital asset can control or manage the access of the digital asset across the plurality of computer networks. The multinetwork digital asset control system thereby controls the digital asset across the plurality of computer networks.

According to an example embodiment, the digital asset may be configured as a non-fungible token (NFT). In another example embodiment, the NFT may be configured with at least one of: an indication of an owner, status flag(s), and an ERC-721 (Ethereum Request for Comments issue number 721) interface.

In an example embodiment, at least one of the computer networks may be configured as a blockchain computer network.

According to an example embodiment, the multinetwork digital asset control system may be further configured to resolve a disparity of the disparity(ies) between the at least two computer networks. The disparity may include: (i) an exchange value of the digital asset, (ii) an exchange cost associated with the digital asset, (iii) another exchange parameter associated with the digital asset, (iv) an environment of use for the digital asset, the environment of use belonging to a given computer network of the at least two computer networks, or (v) a combination thereof. In another example embodiment, the environment of use may include an online gaming environment. The multinetwork digital asset control system may be further configured to validate a request to perform an action upon the digital asset in the online gaming environment. The multinetwork digital asset control system may be further configured to preempt performance of the action in computer networks of the plurality of computer networks different from the given computer network. The multinetwork digital asset control system may be further configured to preempt performance of the action in environments of the given computer network different from the online gaming environment.

In an example embodiment, controlling the digital asset may further include ascertaining or identifying at least one security vulnerability pertaining to the digital asset on a given computer network of the plurality of computer networks.

According to an example embodiment, the multinetwork digital asset control system may be further configured to configure a first clone of the instantiated respective clones to enforce a rule pertaining to a second clone of the instantiated respective clones. The first clone may belong to a given computer network of the plurality of computer networks. The second clone may belong to a given other computer network of the plurality of computer networks.

In an example embodiment, rule(s) of the rules may be configured to computationally assign permissions to a given node of a given computer network of the plurality of computer networks. The permissions may be configured to unlock a given clone of the instantiated respective clones. The given clone may belong to the given network. The permissions may be further configured to unlock the given clone using a zero-knowledge proof (ZKP).

According to an example embodiment, the multinetwork digital asset control system may be further configured to implement rule(s) of the rules as a smart contract.

In an example embodiment, the multinetwork digital asset control system may be further configured to implement a multiparty computation (MPC) security mechanism for the cryptographic key by computationally processing key shard(s) of the cryptographic key and assigning the computationally processed key shard(s) to respective node(s). The respective node(s) may belong to computer network(s) of the plurality of computer networks.

According to an example embodiment, the first node may include a secure cryptoprocessor implemented as a dedicated microprocessor configured to execute the multinetwork digital asset control system. The multinetwork digital asset control system may be embedded on the secure cryptoprocessor.

In an example embodiment, the multinetwork digital asset control system may be further configured to computationally pair respective cryptographic keys with respective nodes of the plurality of computer networks. The multinetwork digital asset control system may be further configured to validate, based on the computationally paired respective cryptographic keys, a source of an access instruction. The access instruction may be received from a given node of the respective nodes and pertain to the digital asset or a clone of the instantiated respective clones. The multinetwork digital asset control system may be further configured to verify the access instruction based on a computational authorization received from one or more other nodes of the respective nodes. The one or more other nodes may be different from the given node. According to another example embodiment, the access instruction may be an encrypted access instruction. The multinetwork digital asset control system may be further configured to decrypt the encrypted access instruction. Further, in yet another example embodiment, the multinetwork digital asset control system may be further configured to interface with a virtual machine (VM) embedded oracle. The multinetwork digital asset control system may be further configured to receive, via the VM embedded oracle, the access instruction and/or the computational authorization.

Alternative computer-implemented method and computer program product embodiments parallel those described above in connection with the example computer-based system embodiments.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
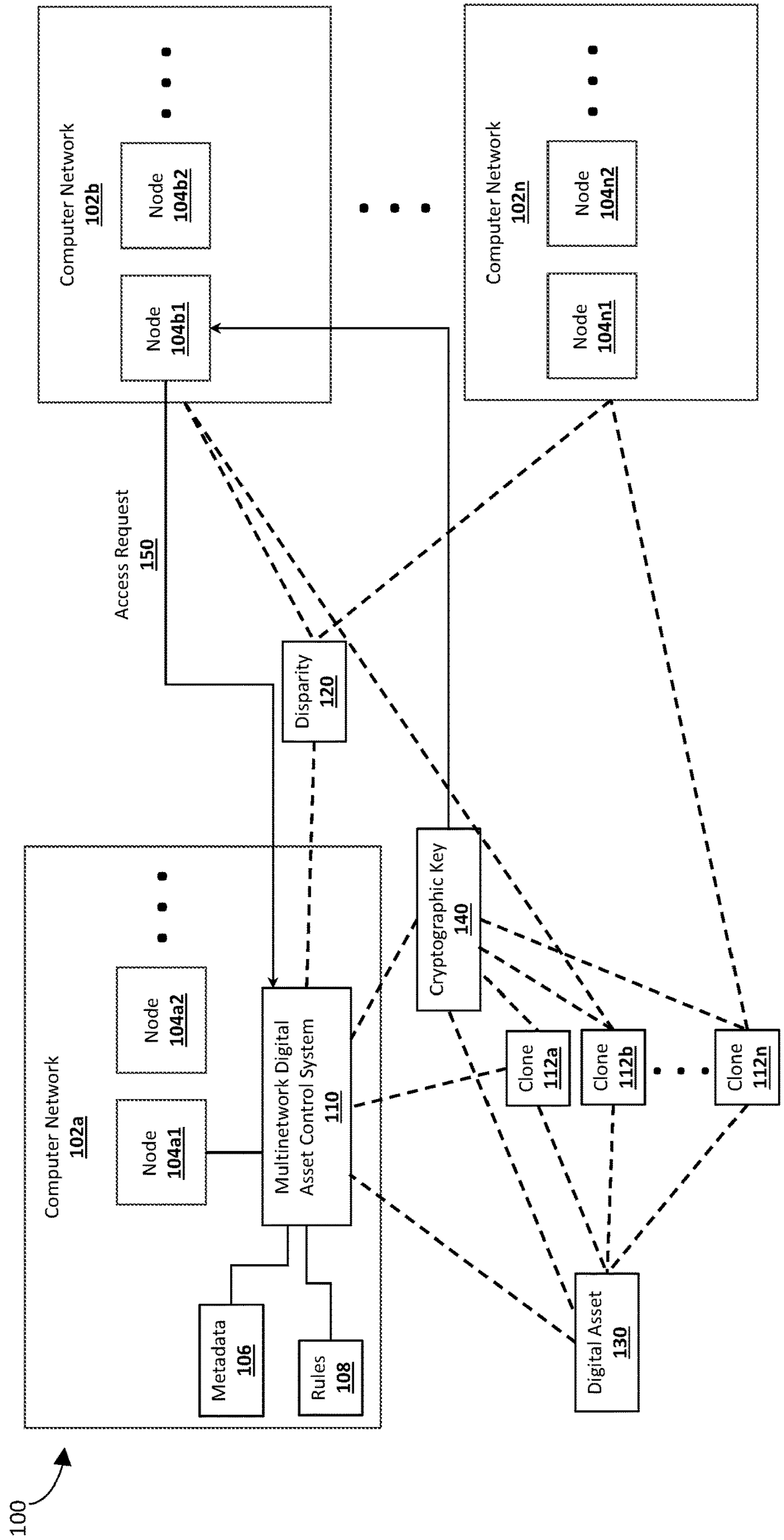
FIG. 1 is a block diagram of an example embodiment of a system for multinetwork digital asset control.

A description of example embodiments follows.

In general, blockchain is a write-once, append-many type electronic ledger. Blockchain is an architecture that allows disparate users to make transactions and creates an unchangeable record of those transactions. To move anything of value over any kind of blockchain, a network of nodes must first agree that a corresponding transaction is valid. As a peer-to-peer (P2P) network, combined with a distributed time-stamping server, blockchain ledgers can be managed autonomously to exchange information between disparate parties; there is no need for an administrator. In effect, the blockchain users are the administrator.

Blockchain's rapid development has given rise to many different kinds of chains, leading to cross-chain technology. Cross-chain, as its name suggests, allows the transmission of value and information between different blockchains. According to an example embodiment, a digital asset may be exchanged, cross-chain, securely, and despite differences between constraints or rules of operation that may be established for the different blockchains. Such a digital asset may be in the form of a token, which may be fungible, or may be a non-fungible token (NFT). Such constraints or rules may be in the form of smart contracts, or other forms. Differences between such constraints or rules may include disparate levels of rigor or leniency of such constraints or rules between or among different blockchain networks.

In some embodiments, blockchain may be a P2P, electronic ledger that is implemented as a computer-based decentralized, distributed system made up of blocks, which, in turn, are made up of transactions. Each transaction may be a data structure that encodes a transfer of control of a digital asset between participants in the blockchain system, and that includes at least one input and at least one output. Each block may contain a hash of a previous block so that blocks become chained together to create a permanent, unalterable record of all transactions that have been written to the blockchain since its inception. Transactions may contain small programs, known as scripts, embedded into their inputs and outputs; the scripts may specify how and by whom the outputs of the transactions can be accessed.

For a transaction to be written to the blockchain, it must be "validated." Network nodes (miners) may perform work to ensure that each transaction is valid, with invalid transactions being rejected from the network. Software clients installed on the nodes may perform this validation work on an unspent transaction (UTXO) by executing its locking and unlocking scripts. If execution of the locking and unlocking scripts evaluates to TRUE, the transaction is valid and is written to the blockchain. Thus, for a transaction to be written to the blockchain, it should be: (i) validated by a first node that receives the transaction—e.g., if the transaction is validated, the node relays it to other nodes in the network; (ii) added to a new block built by a miner; and (iii) mined, e.g., added to the public ledger of past transactions.

Blockchain may be used for implementation of "smart contracts" that can be associated with digital assets. These are computer programs designed to automate execution of terms of a machine-readable contract or agreement. Unlike a traditional contract, which would be written in natural language, a smart contract is a machine-executable program that may include rules for processing inputs to generate results; these results may then cause actions to be performed depending upon those results. With respect to commercial transactions, for example, these may involve a transfer of property rights and/or assets. Such assets may include real property, personal property (including both tangible and intangible property), digital assets such as software, or any other type of asset. In the digital economy, there is often an expectation that exchanges and transfers will be performed in a timely manner and across vast distances. This expectation, along with practical, technical limitations, means that traditional forms of asset transfer, such as physical delivery of hardcopy of documents representing a contract, negotiable instrument, etc., or a tangible asset itself, are not desirable. Thus, smart contracts can provide enhanced control, efficiency, and speed of transfer.

An area of blockchain-related interest is a use of "tokens" to represent and transfer assets via the blockchain. A token thus serves as an identifier that allows a real-world item to be referenced from the blockchain. Through an initial coin offering (ICO) model, startups may raise capital by issuing tokens on a blockchain, such as Ethereum, and distributing them to token buyers in exchange for making a financial contribution to a project. These tokens, which may be transferred across a network and traded on cryptocurrency exchanges, may serve a multitude of different functions, from granting holders access to a service to entitling them to company dividends. Depending on their function, tokens may be classified as security tokens or utility tokens.

Tokens may be used, for instance, in an initial public offering (IPO) to issue, e.g., company shares, dividends, and/or voting rights over blockchain networks. The tokens may include, e.g., security tokens and/or utility tokens. The security tokens may be associated with a value that is derived from a tradable asset and, thus, may be deemed a security token that may be subject to federal laws regulating traditional securities. In contrast, the utility tokens may represent future access to a company's product(s) and/or service(s). A defining characteristic of the utility token is that it is not designed as an investment. Because a utility token is not issued in the form of an investment asset, it may be exempt from having to comply with federal legislation regulating securities.

Further, similar to physical assets, the tokens that represent them may have many properties, one of which is fungibility or non-fungibility. In economics, fungibility refers to equivalence or interchangeability of each unit of a commodity with other units of the same commodity. Fungible tokens (FTs) are tokens that can be exchanged for any other token with the same value.

Fungible tokens are uniform, that is, FTs of the same type are identical in specification. In other words, each FT is identical to another FT of the same type, and FTs are divisible into smaller amounts. Similar to currency, where bills can be divided into coins of an equivalent value, FTs are divisible. As such, a fraction of an FT can be transferred between users. NFTs, however, cannot be replaced with other tokens of the same type. NFTs represent nonfungible assets, e.g., assets that have unique information or attributes. Each NFT is unique and differs from other tokens of the same class. For example, while plane tickets from and to a same destination may look the same, each one has a different passenger name, seat number, etc., and, therefore, is unique. In contrast to FTs, NFTs cannot be divided, an elementary unit of the NFT is the token itself.

Due to an immutable nature of transaction histories supported by blockchain networks, it is possible to extend the aforementioned validation steps of such transactions so that the transactions become subject to certain rules that reference prior transactions, or even aspects of an initial creation of a subject digital asset, e.g., a NFT. An example of such rules is an arrangement wherein royalties are paid to a creator of a digital asset each time the digital asset is sold to a subsequent owner. Such royalty payment arrangements may be implemented as a function with which the blockchain network is programmed, or using a reference table loaded into a computer memory element of the blockchain network, as a smart contract as described hereinabove, or by other means.

A further use case for cryptocurrency exchanges on a blockchain network is that such exchanges can protect transactions-similar to a manner in which a surety bond would. A surety bond or surety is a promise by a surety or guarantor to pay one party a certain amount if a second party fails to meet some obligation, such as fulfilling terms of a contract. The surety bond protects an obligee against losses resulting from a principal's failure to meet the obligation. As cryptocurrencies evolve from fringe investments to mainstream instruments, surety bonds may become an increasingly common requirement for those looking to trade in virtual currencies.

Ordinary surety bonds act as a contract between three parties: (i) an entity requesting the bond (principal), (ii) the bond's beneficiary (obligee), and (iii) a company issuing the bond. What a surety bond does is guarantee that the principal will fulfill its obligations, whether it's completing a long-term project or processing a financial transaction, or else forfeit the bond. Cryptocurrency surety bonds work in the same basic manner, ensuring that the principal performs cryptocurrency transactions as expected, or else forfeits the bond. In this case, the contract is between an entity handling a virtual currency transaction, a regulatory entity requiring the surety bond, and a surety bond provider.

In an example embodiment, a digital wallet is configured to control or manage digital assets across multiple networks. Such networks may be blockchain networks. Protocols may be designed to use metadata and/or rules, e.g., predefined rules, to control or track assets spanning multiple networks. Such control and management techniques may be distinguished from traditional bridging by resembling passage of messages via a protocol from one network to another, rather than passing an asset itself or its representation. The techniques may thus be thought of as an asset mirror, wherein clones of the asset exist on multiple networks, and a cryptographic key to unlock one clones at a time is passed from network to network. In this way, pairing a digital wallet with interchain messaging solves problems inherent to bridging.

According to another example embodiment, a digital asset may be deposited on a first network. Subsequently, an arbiter may clone the digital asset on a second network, and the original digital asset on the first network may be burned or, alternately, locked. Certain embodiments may take advantage of disparities among different networks, where the disparities relate to a digital asset. Examples of such cross-network disparities involving a digital asset may include, but are not limited to, an exchange value of the digital asset, exchange cost(s) for the digital asset, other exchange parameters for the digital asset, and environment(s) of use for the digital asset. For instance, environments for using a digital asset may include online gaming environments, and it may be more expensive to play games on one network versus another. Some embodiments provide means of achieving, e.g., minimal, or zero, gas costs, and/or trustlessness for digital asset transactions occurring across multiple networks.

Further, in yet another example embodiment, a protocol may be configured such that an arbiter can respond to or resolve security vulnerabilities associated with transactions, or at least identify such vulnerabilities. Particularly for interchain exchanges involving NFTs and/or cryptocurrency, precision may be required to produce an accurate clone on a receiving network, so that NFTs may remain unique and cryptocurrency may not be accidentally lost or improperly gained. Cloned digital assets may also be capable of supporting enforcement of properties from their corresponding representations on prior networks. Such enforcement may be based on an address associated with an electronic wallet, instead of upon a smart contract. As such, disparate networks may not need to be aware of each other's operational details, settings, or parameters.

According to an example embodiment, representations of digital assets on some networks may be deemed to be burned when they are sent to a location on a network such that they are provably irretrievable. The location may be an addressed portion of a blockchain that does not actually exist, or does not respond to requests, or is otherwise inaccessible. However, a record of the digital asset having previously existed elsewhere may remain immutable. Burning may be performed by an arbiter.

In another example embodiment, alternatively to burning, representations of digital assets may be locked on certain networks. This may allow a digital asset's full history to be reactivated if the digital asset is effectively returned to a network that it had previously occupied. Some networks that store such digital asset histories may present a better exchange value for digital assets in comparison with other networks.

Further, in yet another example embodiment, NFTs as example digital assets may have a specified owner, various setting(s) or flag(s) (e.g., status flag(s)), or an interface, e.g., a generic ERC-721 (Ethereum Request for Comments issue number 721) interface. With such a digital asset held on a blockchain, a node may sign (e.g., with a cryptographic signature) a transaction to open an electronic locker, after which the digital asset may be deposited in the electronic locker with the signature and thereby locked. A smart contract may become the specified owner of the digital asset. For a node to then interact with the digital asset on the network on which it is locked, the node may need to unlock the digital asset with a cryptographic signature. The node may also be required by the smart contract to have an indication of permission to unlock or interact with the digital asset. Rules of the smart contract may govern when the digital asset can be unlocked. Such rules may include various criteria and/or sub-criteria that must be met. Unlocking an asset may include assigning the asset to another electronic wallet or other destination, or releasing the electronic wallet and pulling the digital asset out of the electronic wallet.

According to an example embodiment, protocols such as Spring or Cosmos® Inter-Blockchain Communication Protocol (IBC) or any other suitable known protocol may be used. For instance, a protocol may support subchains, with messages capable of being transmitted to and from different subchains. Application-layer instructions may trigger actions on a digital asset that is locked on a local chain but active elsewhere. For example, interacting with a digital asset in an ERC-721 interface may affect an in-game representation of the digital asset, and thus allow a user to play a game while using the digital asset in the game environment. If a node tries to concurrently interact with the digital asset on its original blockchain, the interaction may fail because the digital asset will be flagged as locked.

In another example embodiment, an asset lock may be implemented at a smart contract level. A signature, e.g., a cryptographic signature, required to retrieve a locked asset may be restricted by an implementation of multiparty computation (MPC), with multiple cryptographic key shards distributed to disparate entities.

Further, in yet another example embodiment, in lieu of a central server, an oracle may inherit a protocol and comprehend or interpret rules of a smart contract. The oracle may control or manage enforcement at a network level, and participate in key, e.g., cryptographic key, signing. If smart contracts are limited in scope to their respective host networks, the oracle may verify aspects of trust. The oracle may thus control or manage effects of rules from smart contracts on other networks. In addition, the oracle may verify metadata as a rules set, such as a number of blocks.

According to an example embodiment, protocols may thus (i) provide a messaging bus, (ii) institute or establish rules on networks on each side of the bus, and (iii) enforce or control information from each side. Multisignature implementations may be used in conjunction with protocols such as Spring or Cosmos IBC. Spring may require adoption of new rules for locked and unlocked digital assets, thereby acting as an extended smart contract shim layer. Embodiments can thus solve issues with rejections of digital asset exchanges based on late discoveries of a lock switch at the time of exchange, by having the lock switch and lack of corresponding key, e.g., a cryptographic key, prevent or preempt listing of a digital asset for exchange in the first place.

A digital asset exchange platform may leverage a clearinghouse to enforce a contract governing transfer of tokens between electronic wallets. The contract may specify royalties to be paid to an original creator of a token upon transactions involving that token. In addition, the contract may include a revenue share table. The clearinghouse may be configured to enforce the contract regardless of network locations of two parties involved in a transaction, and regardless of whether or not the transaction is conducted within the digital asset exchange platform. For example, even offline exchanges may be made transparently viewable from within the digital asset exchange platform. The clearinghouse may be configured to serve any token creator. In addition, the clearinghouse may include a minimax recursive algorithm to facilitate a threshold value associated with the token.

In an example embodiment, upon creation of a token, a threshold value of that token may be set within the digital asset exchange platform. The clearinghouse may implement rules in conjunction with the threshold value to prevent the value of the token from experiencing dramatic changes characteristic of backdoor or offline transactions. As such, the threshold value may act as a floor price of the token required to activate any transaction involving the token. The clearinghouse may manage and approve or deny transactions accordingly. Rules such as threshold values may be based on a bounded percentage of a price change from a previous transaction. Such a clearinghouse can be implemented in a decentralized manner, such as with a smart contract. A central authority may thus not be required.

Certain embodiments may offer techniques for verifying or checking an identity that protect, preserve, and maintain privacy. Safeguarding privacy within blockchain networks is an important consideration for traditional institutions such as banks and other financial institutions that may desire to interact with and/or launch smart contracts, for example, as part of digital asset transactions, but may also need to keep trade secrets and/or sensitive customer information etc. confidential. As to the latter, such institutions may also be required to comply with rules and/or regulations including, but not limited to, the Europe Union's General Data Protection Regulation (GDPR) and the United States' Health Insurance Portability and Accountability Act (HIPAA), among other examples.

In an example embodiment, a multinetwork digital asset control system may be accomplished by use of, e.g., a zero-knowledge proof (ZKP). A zero-knowledge proof implementation in the multinetwork digital asset control system ensures enforcement of encoded rules configured in NFT assets utilizing a technique whereby a first entity (or "prover"), such as first transacting entity, a first wallet etc., may cryptographically prove to a second transacting entity (or "verifier") that the first entity possesses knowledge regarding certain information regarding the encoded rules in configured in the NFT, without also disclosing the actual contents of the information.

ZKPs may be interactive or non-interactive. An interactive ZKP requires interaction between a prover entity and a verifier entity involved in an NFT encoded rule enforcement transaction processed by the multinetwork digital asset control system. A non-interactive ZKP may be constructed from any interactive scheme by relying on, e.g., a Fiat-Shamir heuristic, or any other suitable technique known to those of skill in the art.

According to an example embodiment, a protocol implementing ZKPs may be presented as a transcript where a prover (first entity) responds to interactive inputs from a verifier (second entity). In another example embodiment, the interactive input may be in the form of one or more challenges such that responses from the prover will convince the verifier if and only if a statement is true, e.g., if the prover does possess certain asserted knowledge.

In the context of blockchain networks, according to some embodiments, by employing a ZKP, the only information divulged on-chain is that some piece of undisclosed information is (i) valid and (ii) known by the prover with a high degree of certainty. As such, in an example embodiment, ZKPs may be used by various blockchains to furnish privacy-maintaining digital asset transactions, whereby, for example, a transaction's amount, sender electronic wallet identifier, and receiver electronic wallet identifier are kept secret. Furthermore, some embodiments relate to oracle networks that provide smart contracts with access to off-chain data and/or computing infrastructure. Such oracle networks may also employ ZKPs to prove a certain fact about off-chain data, without divulging the data itself on-chain. A method used for performing non-interactive ZKPs may be as described in D. Unruh, "Non-Interactive Zero Knowledge Proofs in the Random Oracle Model," in *EUROCRYPT* 2015, 2015, pp. 755-84, which is herein incorporated by reference in its entirety.

Further, a method for creating and executing ZKP applications in embedded systems may be as described in Salleras, et al., "ZPiE: Zero-Knowledge Proofs in Embedded Systems," Mathematics, vol. 9, no. 20, p. 2569, 2021, which is herein incorporated by reference in its entirety.

A digital wallet, such as a hybrid multisignature digital wallet, may be provided to enable a licensed custodian or designee to provide signatures or keys required to approve a digital transaction. The custodian may approve transfers of tokens on digital exchange platforms such as blockchain platforms. A set of custodian signatures, potentially from multiple custodians, may be required to approve a transaction. Alternatively, the hybrid multisignature digital wallet may be configured in a one-of-many or a one-of-one setup, requiring only a single signature of one or more valid signatures from one or more custodians to approve the transaction. If a network allows a designated party to be a custodian, that party may enter into an agreement at the protocol level on the network to become a designated custodian. The hybrid multisignature digital wallet may be implemented in support of compliance operations. The custodian may facilitate recovery or replacement of lost signatures or keys, or of entire lost wallets.

The hybrid multisignature digital wallet may enable transactions such as token swaps, and may facilitate transfer of tokens across multiple networks. Individual networks of the multiple networks may implement rigorous or lenient constraints upon transactions performed within the respective networks. Thus, a disparity may exist between two networks involved in a token transfer. The custodian may facilitate management of such a disparity. The custodian may perform functions characteristic of an automated escrow service in conjunction with a digital exchange platform.

A composable digital asset integrates two or more individual digital assets into a new combined form, which may be referred to as an asset cluster. An asset cluster may comprise components of similar or different types. For example, an asset cluster may include an element of fungible currency such as cryptocurrency, along with a NFT. Thus, combining an amount of cryptocurrency with an NFT effectively establishes a floor value for the NFT equal to the value of the fungible cryptocurrency.

Such composable assets may find applications in areas such as finance and gaming. An example embodiment of a gaming application of composable digital assets involves a piece of armor having a socket, into which a gem may be placed, creating an asset cluster. Asset clusters may be decomposed at any time such that the NFT and the currency item again become separate entities on a digital exchange platform.

Composable digital assets can provide liquidity for any digital asset or token. For example, a player of a game incorporating composable digital asset clusters may use a currency component of a cluster to set an instantaneous value at which to sell the cluster, such as to an automated market maker (AMM) associated with the game. Composable assets may be referenced or required by contracts or rules governing transactions on a digital exchange platform, such as smart contracts.

An AMM cryptographic system may be configured to provide liquidity to a platform enabling exchange of digital assets as described herein. The exchange platform may be decentralized. Liquidity may be provided using underlying collateral. The AMM cryptographic system may take in and store different forms of digital assets, such as loans, to be used as collateral in future exchanges on the platform. Such assets may be aggregated within a collateral pool, such that liquidity is pooled in association with the exchange platform. Liquidity may thus be pooled and aggregated on a blockchain supporting the collateral pool. Assets may be withdrawn from the collateral pool upon minting a collateral token. The collateral token may thus consolidate liquidity for an exchange within one protocol or contract. In addition, the collateral token may provide liquidity for a one-to-one exchange with a user looking to sell or redeem a user-held token.

In an example embodiment, a clearinghouse program implemented upon the platform may be configured to force an exchange to be performed on the platform such that the exchange is managed by the AMM cryptographic system. A machine learning (ML) oracle of the AMM cryptographic system may set a computational value for a collateral token, and may offer the collateral token for exchange at such a computational value, thus quantifying the market value for that token, rather than deferring to market forces. The AMM cryptographic system may function with either a bounded or unbounded token supply, providing continuous liquidity. The AMM cryptographic system may be configured to measure supply and demand for tokens on the platform, including the collateral tokens. The AMM cryptographic system may be configured with an encoder/decoder. The AMM cryptographic system encoder may be configured to mint and/or encode collateral tokens.

The AMM cryptographic system may be implemented by any suitable protocol known to those of skill in the art, such as ERC-20, among other examples.

FIG. 1 is a block diagram of an example embodiment of a system 100 for multinetwork digital asset control. The system 100 includes computer networks 102*a-n* each having a respective plurality of nodes. For instance, computer network 102*a* may have nodes 104*a*1-2, etc., computer network 102*b* may have nodes 104*b*1-2, etc., and computer network 102*n* may have nodes 104*n*1-2, etc. A first node of a first computer network of the plurality of computer networks 102*a-n*, e.g., first node 104*al* of first computer network 102*a*, may be configured to execute a multinetwork digital asset control system 110.

Continuing with FIG. 1, the multinetwork digital asset control system 110 may be configured to resolve disparity(ies) between two or more computer networks of the plurality of computer networks, e.g., disparity 120 between computer networks 102*b* and 102*n*, based on metadata and/or rules, e.g., metadata 106 and/or rules 108. The multinetwork digital asset control system 110 may be further configured to control or track a digital asset, e.g., digital asset 130, across the plurality of computer networks 102*a-n*. Controlling the digital asset 130 may include instantiating respective clones, e.g., clones 112*a-n*, of the digital asset 130 on respective computer networks of the plurality of computer networks 102*a-n*. For instance, clone 112*a* may correspond to computer network 102*a*, clone 112*b* may correspond to computer network 102*b*, and clone 112*n* may correspond to computer network 102*n*. To continue, controlling the digital asset 130 may further include configuring or creating a cryptographic key, e.g., cryptographic key 140, to secure the digital asset 130 and the instantiated respective clones 112*a-n*. Controlling the digital asset 130 may further include validating an access request, e.g., access request 150, by a second node, of a second computer network of the plurality of computer networks 102*a-n*, e.g., second node 104*b*1 of second computer network 102*b*, by transferring the cryptographic key 140 to the second node 104*b*1. The access request 150 may be for the digital asset 130 or a clone of the instantiated respective clones 112*a-n*. To continue, controlling the digital asset 130 may further include, responsive to the transferring, preempting access to clones of the instantiated respective clones 112*a-n*. The clones may be instantiated on computer networks of the plurality of computer networks 102*a-n* different from the second computer network 102*b*. For instance, access may be preempted to clones 112*a* and 112*n* that are instantiated on computer networks 102*a* and 102*n*, respectively—i.e., not on the second computer network 102*b*.

As shown in FIG. 1, the system 100 may thereby control the digital asset 130 across the plurality of computer networks 102*a-n*.

Figure 2:
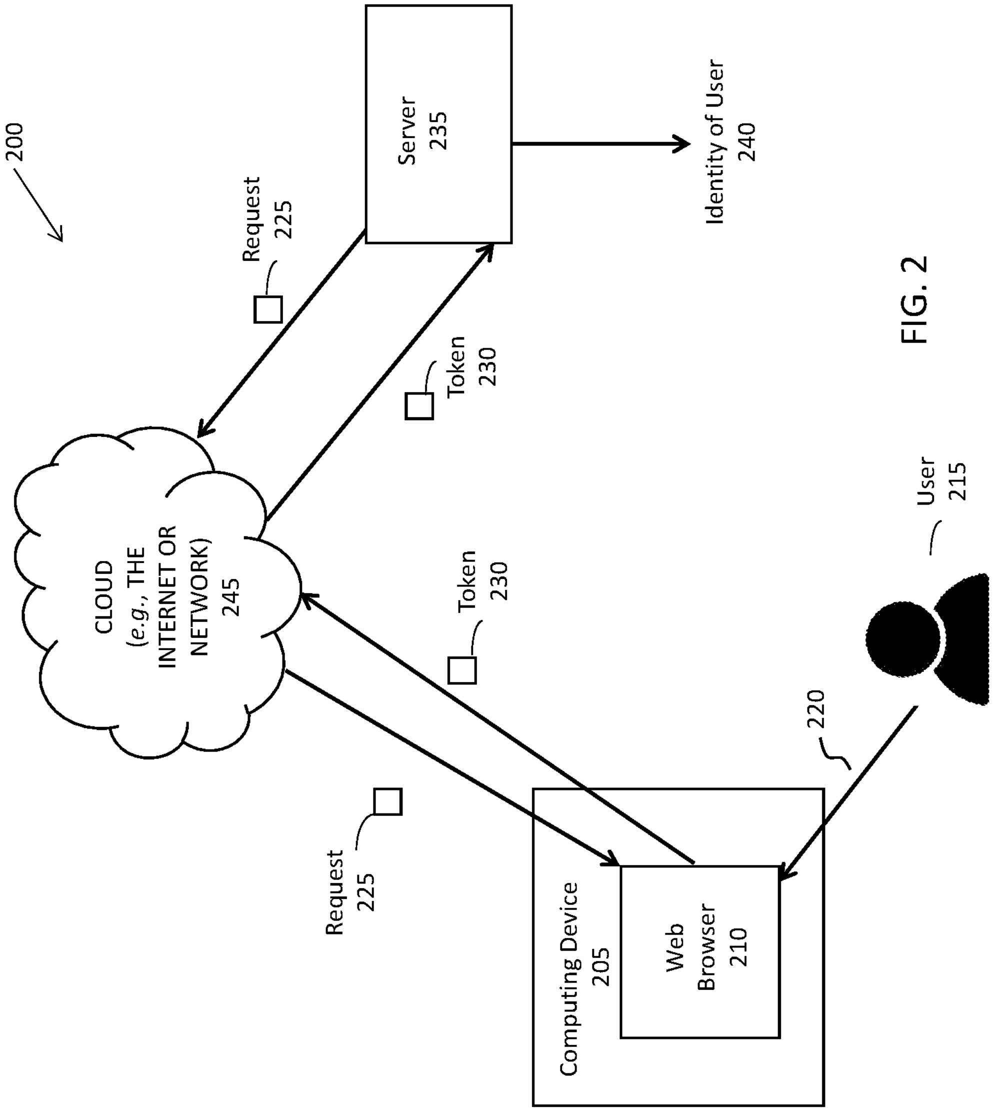
FIG. 2 is a block diagram of an example user identification system according to an embodiment.

FIG. 2 shows an example of a user identification system 200 according to an embodiment. A user 215 interacts via user input 220 with a website displayed via a web browser 210 running on computing device 205, such as clicking an advertisement on the displayed website. The interaction is communicated to server (e.g., token server) 235. For example, a transparent pixel or script may be placed on the displayed website to communicate the interaction to the server 235.

An application executing on the server 235 determines whether the user 215 is a software robot or a person user by issuing a request 225 to web browser 210 to produce a token. The request 225 is sent over a network 245. In response to request 225, web browser 210 produces a token 230 on computing device 205. The token 230 is sent to the server 235 over network 245. The application executing on server 235 determines (e.g., using a computational challenge) a computational cost of producing the token 230. In some embodiments, the computational cost of producing the token 230 is based on the time taken to produce the token 230. Based on the computational cost of producing the token 230, the application on server 235 determines (deciphers) whether the user 215 is a software robot or a person user. In some embodiments, proving the computational cost of producing the token 230 at the computing device 205 is performed by an independent third party, rather than the application executing on server 235.

An application that determines whether the user 215 is software robot or a person user may also exist locally on the computing device 205. In this embodiment, it would not be necessary to send request 225 or token 230 over a network 245.

In some embodiments, the request 225 is issued in response to particular user engagement in the web browser 210 and based on user engagement metrics, including mouse movements by the user. The request 225 can also be issued in response to an elapsed period of time or issued by a web service.

In some embodiments, the application on server 235 of FIG. 2 calculates a confidence score and metrics associated with whether the user 215 operating computing device 205 is at least in part by a software robot or a person user. Once the application on server 235 determines whether user 215 is a software robot or a person user, the application on server 235 returns the identity of the user 240 and a calculated confidence score, which is associated with a likelihood of whether computing device 205 is being operated by a software robot or a person user. Thus, the calculated confidence score indicates a confidence value regarding the user identification. The confidence score helps the relying party determine a measure of confidence about the identity of the user 240.

The confidence score can be based on many different factors. One factor is the computational cost of the produced token 230. If the proven computation cost is low (below a threshold value), the confidence score may be increased. Further, if computing device 205 is a server, the computational cost is higher than if the computing device 205 is an individual machine, and thus the confidence score may be increased. The confidence score may be based on the time it took computing device 205 to produce the token 230. For example, longer times (e.g., above a time threshold) for producing token 230 may be associated with a higher likelihood that the identity of the user 240 is a software robot and a lower likelihood that the identity of the user 240 is a person user. In another embodiment, the confidence score is increased if the computing device 205 includes a Trusted Platform Module (TPM).

According to some embodiments, produced token 230 is captured in a cookie. In an embodiment, the captured produced token and the computational cost of the captured produced token 230 are time sensitive and expire after a period of time. Captured cookies can sign cookies generated in the future thus, building up proof of whether the web browser 210 running on computing device 205 is being operated by a person user or a bot. The building up of proof results in a longer block chain, making it increasingly difficult for a web browser running on a machine that is operated by a bot to continue to produce tokens.

In some embodiments, the confidence score may be calculated to further consider the confirmed purchase activities of the user. The score may increase when determined that a user is a verified purchaser who previously completed an online purchase. The proof of a user being an online purchaser, such as a retrieved proof of purchase cookie associating the user's identity to an entry in a database of confirmed purchases may increase the confidence score. For example, a retrieved proof of purchase cookie associating the user's identity particularly to a persistent entry in a block chain database of confirmed purchases may further increase the confidence score. That is, the trusted confirmation of the user as a verified purchaser may be associated with a higher likelihood (confidence) that the identity of the user is a person (rather than a software robot).

Figure 3:
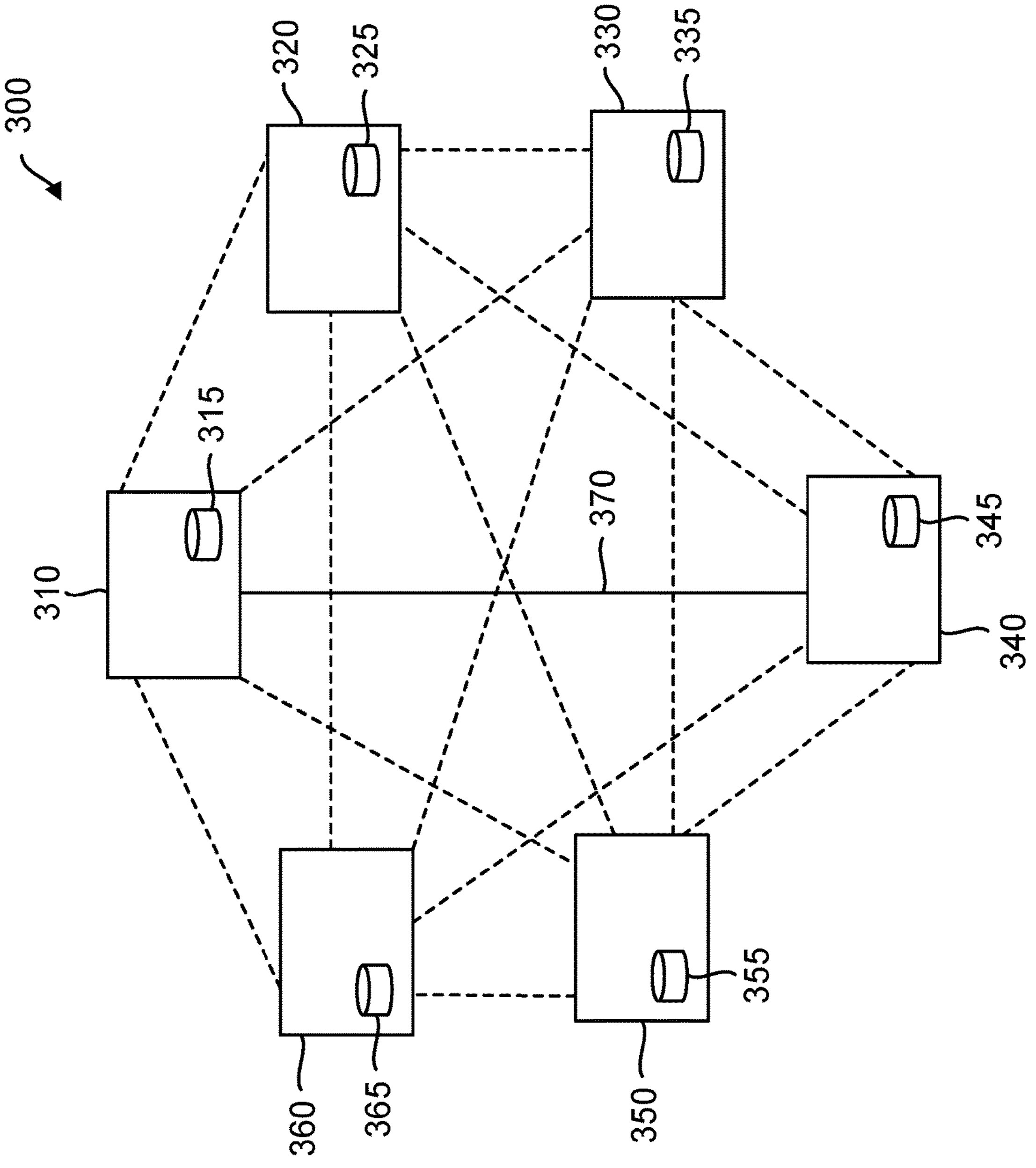
FIG. 3 is a block diagram of an example embodiment of a distributed blockchain ledger computer-implemented system.

FIG. 3 is a block diagram of an example embodiment of a blockchain network 300, also referred to interchangeably herein as a distributed ledger network 300, that may be accessed according to an example embodiment. The blockchain network 300 is a distributed ledger P2P network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 300 to transfer and record, in the form of blockchain based records, movement of tokens. Such blockchain based records form a cryptographically secured backlinked list of blocks.

The distributed ledger network 300 includes multiple computing devices configured as nodes 310, 320, 330, 340, 350, 360 of the distributed ledger network 300. Each node 310, 320, 330, 340, 350, 360 locally stores and maintains a respective identical copy 315, 325, 335, 345, 355, 365 of the blockchain ledger in memory communicatively coupled to the node. The nodes exchange messages within the distributed ledger network 300 to update and synchronize the ledger stored and maintained by each node. The nodes may also execute decentralized applications (dApps), such as via smart contracts, for processing the messages. A message transmission 370 from the node 310 to the node 340 may be used to exchange a token in the distributed ledger network 300 as shown in FIG. 3. The dotted lines between each set of nodes in the distributed ledger network 300 indicate similar transmissions that may be exchanged between any other set of nodes in the distributed ledger network 300. The messages may include a confirmed transfer for recording data associated with the token being transferred, such as a blockchain public key for each of the one or more parties participating in the transfer.

Continuing with FIG. 3, according to an example embodiment, the blockchain network 300 may be an Ethereum network; however, it should be understood that the blockchain network 300 may also be any suitable blockchain network known to those of skill in the art. Ethereum is a decentralized network of computers with two basic functions: (i) a blockchain that can record transactions and (ii) a virtual machine (VM), that is, an Ethereum Virtual Machine (EVM), that can produce smart contracts. Because of these two functions, Ethereum is able to support dApps. These dApps are built on the existing Ethereum blockchain, piggybacking off of its underlying technology. In return, Ethereum charges developers for the computing power in their network, which can only be paid in Ether (ETH), the only inter-platform currency. Depending on its purpose, a dApp may create ERC-20 tokens to function as a currency. According to an example embodiment, FTs disclosed herein may be ERC-20 tokens or any other suitable FT known in the art.

The code of the smart contract may be uploaded on the EVM, which may be a universal runtime compiler or browser, to execute the smart contract's code. Once the code is on the EVM, the code may be the same across each Ethereum node to be run to check whether one or more condition(s) are met, such as a condition for secure possession of respective shard(s) of a cryptographic key by corresponding node(s) of a blockchain computer network.

Ethereum has a long history of developed standards. For example, ERC-20 is a standard that defines a set of six functions that other smart contracts within the Ethereum computer-implemented ecosystem can understand and recognize. ERC-20 is a protocol standard and in order to be ERC-20 compliant, the functions need to be included in the token's smart contract. ERC-20 outlines a specific list of rules that a given Ethereum-based token has to deploy, simplifying the process of programming the functions of tokens on Ethereum's blockchain. These include, for instance, how to transfer a token (by the owner or on behalf of the owner), such as may be employed for transferring FTs of a buyer, and how to access data (e.g., name, symbol, supply, and/or balance) concerning the token, such as a value of the digital asset 130 (FIG. 1).

Figure 4:
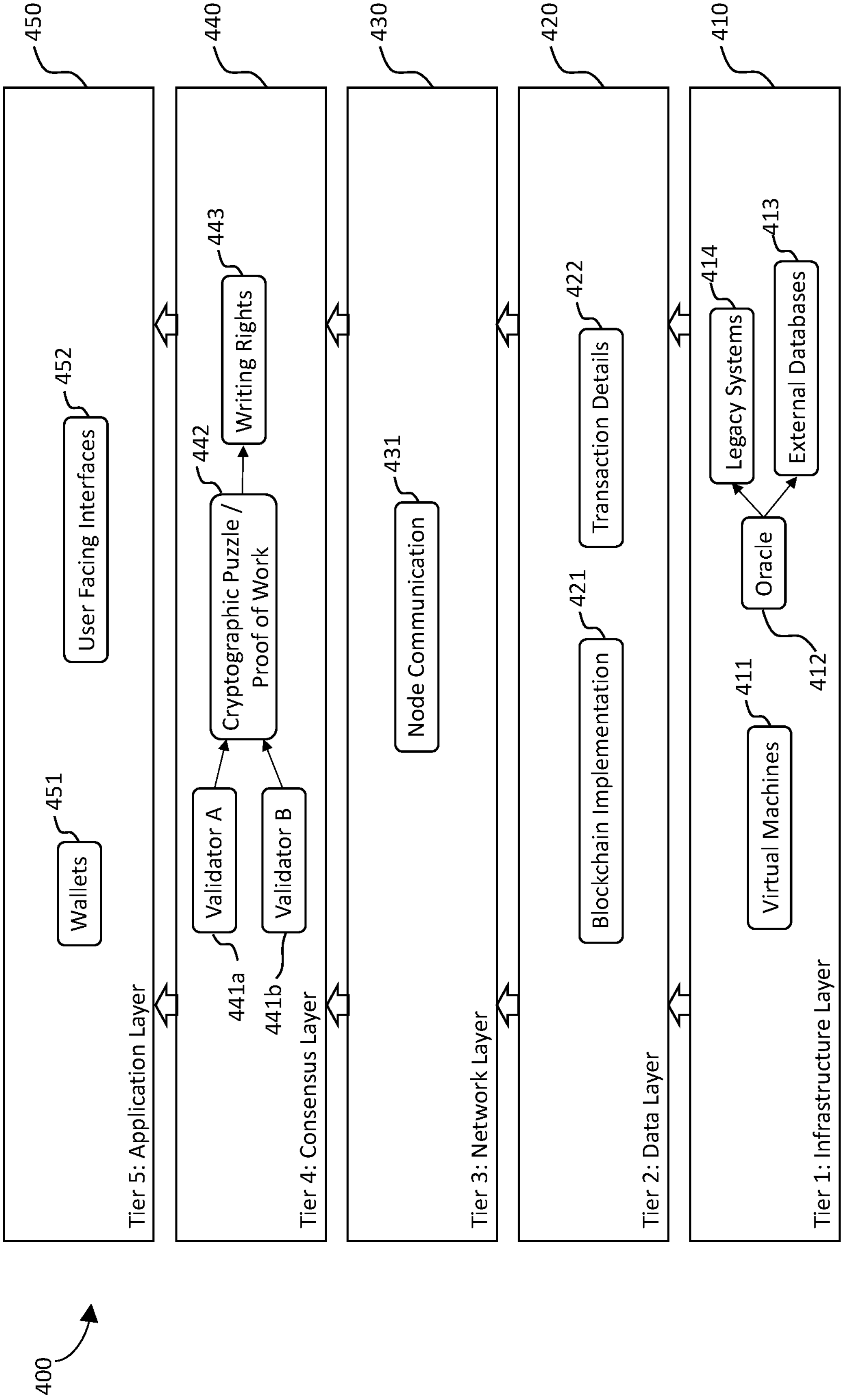
FIG. 4 is a block diagram showing exemplary blockchain layers according to an embodiment.

FIG. 4 is a block diagram showing exemplary blockchain layers 400 according to an embodiment. Blockchain layers 400 may include infrastructure (tier 1) layer 410, data (tier 2) layer 420, network (tier 3) layer 430, consensus (tier 4) layer 440, and application (tier 5) layer 450. The infrastructure layer 410 may be a hardware layer and may include one or more VM(s) 411 and/or one or more oracles 412. A VM 411 may provide a runtime environment for transaction execution in the blockchain. In an embodiment, a VM 411 may be, for example, stack-based and may enable untrusted code to be executed by a global P2P network of computers. An oracle 412 may provide a third-party service that connects smart contracts executing on the blockchain with off-chain data sources. For instance, an oracle 412 may query, verify, and/or authenticate one or more external data sources for the system 100 (FIG. 1) and/or a computer-based system/method 900 (described hereinbelow in relation to FIG. 9). According to an example embodiment, external data sources may include, e.g., one or more legacy systems 414 and/or databases 413.

According to an example embodiment, an oracle node architecture, e.g., oracle 412, may be provided to serve ML models for smart contracts on a blockchain. Example smart contract technology may be implemented by any suitable Web3 blockchain system known in the art, such as Ethereum, Cardano®, Solana, BNB (Build N' Build) Smart Chain, Casper™, Kaleido, or Fantom.

The oracle architecture may be referred to as a "ML oracle." The ML oracle is useful to smart contract developers who want to incorporate ML models into their smart contracts. For example, a smart contract may distribute funds based on an algorithm, and the algorithm may include a ML model that forecasts sales of a product for a given week. The smart contract may invoke an inference call to a model on the ML oracle to obtain the forecast. As a further example, there are generative arts where the generative ML model may be an integral part of an artwork. Interaction with the model to generate new images may be part of a viewing experience. One well-known ML model type used by generative art is a generative adversarial network (GAN). Using the ML oracle, the ML model may become part of an NFT, thereby enabling an interactive viewing experience.

To summarize, in an example embodiment, a smart contract may request an inference call to a ML model by identifying an ML model to call, such as by providing a hash value, and an input to the model. According to one such embodiment, a model file may be uploaded to, e.g., IPFS (InterPlanetary File System) or any other suitable known storage system, by a dApp developer and a model server may download the model file, e.g., using the hash value. For the ML model server to be generic enough to serve a wide range of models, it may also take as an input parameter a model type, e.g., PyTorch, TensorFlow, scikit-learn, or any other suitable known model type, as well as an input and output specification. The input may be data directly received from the calling smart contract, or it may be received indirectly via, e.g., an IPFS URI (Uniform Resource Identifier) or any other suitable identifier known to those of skill in the art. Similarly, the output may be sent back to the smart contract, or it may be uploaded to any suitable known storage system, including, but not limited to IPFS, and the, e.g., URI, may be sent to the smart contract. For instance, a forecasting model may use the direct input/output (I/O) method. An indirect I/O method employing a known storage system such as IPFS may be commonly used by computer vision/imaging models, among other examples.

In an example embodiment, the system 100 or the system/method 900 may include a VM, e.g., VM 411, with a blockchain oracle, e.g., oracle 412.

Continuing with FIG. 4, data layer 420 may interface with infrastructure layer 410 and may include blockchain implementation 421 and transaction details 422. A blockchain is a decentralized, massively replicated database (distributed ledger), where transactions are arranged in blocks, and placed in a P2P network. The blockchain implementation 421 may include a data structure represented, for example, as a linked list of blocks, where transactions are ordered. The blockchain implementation 421's data structure may include two primary components—pointers and a linked list. Pointers are variables that refer to a location of another variable, and a linked list is a list of chained blocks, where each block has data and pointers to the previous block. Each block may contain a list of transactions that happened since a prior block. Transaction details 422 may contain information about transactions occurring on the blockchain.

The network layer 430 may interface with data layer 420 and may also be referred to as a P2P layer or propagation layer. One purpose of network layer 430 may be to facilitate node communication 431, such that nodes can discover each other and can communicate, propagate, and synchronize with each other to maintain a valid current state of the blockchain. A distributed P2P network, e.g., network layer 430, may be a computer network in which nodes are distributed and share the workload of the network to achieve a common purpose. Nodes in network layer 430 may carry out the blockchain's transactions.

The consensus layer 440 may interface with network layer 430 and may ensure that blocks are ordered, validated, and guaranteed to be in the correct sequence. A set of agreements between nodes in a distributed P2P network may be established by the consensus layer 440. The agreements result in consensus protocols or algorithms, which correspond to rules that nodes follow in order to validate transactions and create blocks in accordance with those rules. To validate a transaction, a validator, e.g., validator **441*a* or validator 441*b*, may perform a consensus algorithm, such as proof of work 442 or any other suitable algorithm known in the art. Performing the consensus algorithm may involve expending computational resources to solve a cryptographic puzzle 442. After being validated according to a consensus algorithm, a transaction may be written to the blockchain through a process of writing rights 443**.

The application layer 450 may interface with consensus layer 440 and may include customized applications and services, such as electronic wallets 451. Further, application layer 450 may include (not shown): smart contracts, chain-code, and/or dApps. The application layer 450 may also include applications utilized by end users to interact with the blockchain. Such applications may be, e.g., one or more user facing interfaces 452. Further, such applications may include, for example (not shown): scripts, application programming interfaces (APIs), and/or frameworks.

Figure 5:
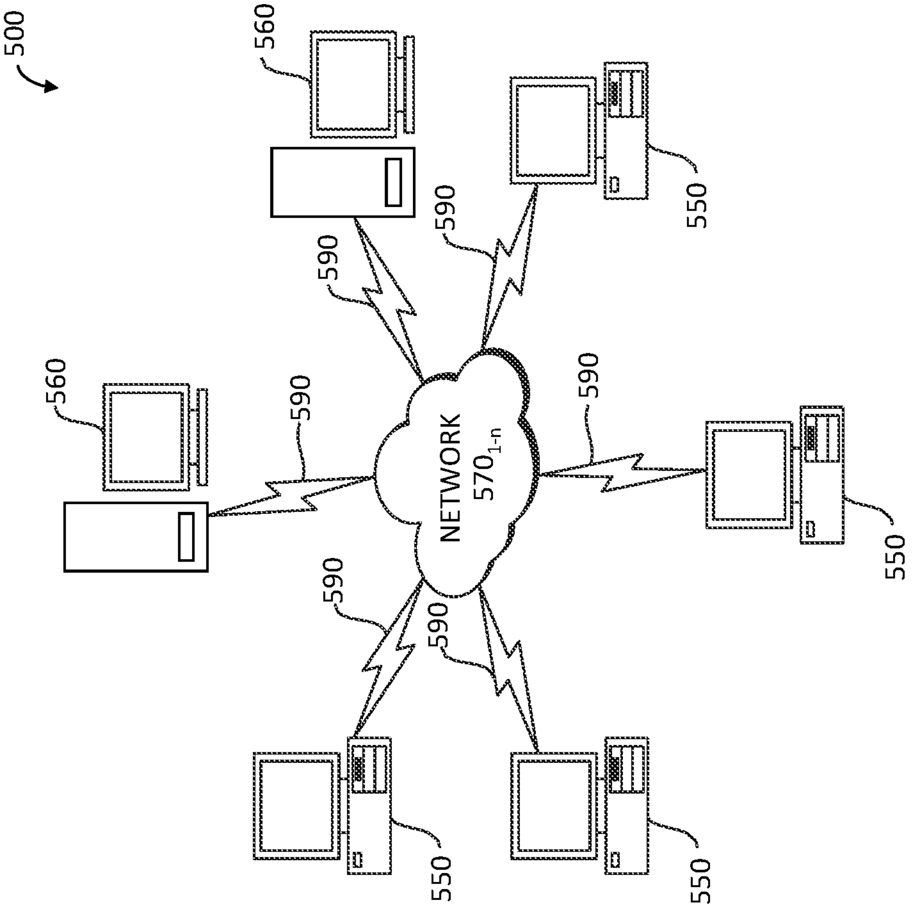
FIG. 5 is a block diagram of an example implementation of a network in communication with an embodiment.

An example digital wallet configured to manage digital assets across multiple networks may be implemented in a software, firmware, and/or hardware environment. FIG. 5 illustrates one such example digital processing environment in which embodiments of the present disclosure may be implemented. Client computer(s)/device(s) 550 and server computer(s)/device(s) 560 provide processing, storage, and I/O devices executing application programs and the like.

Figure 6:
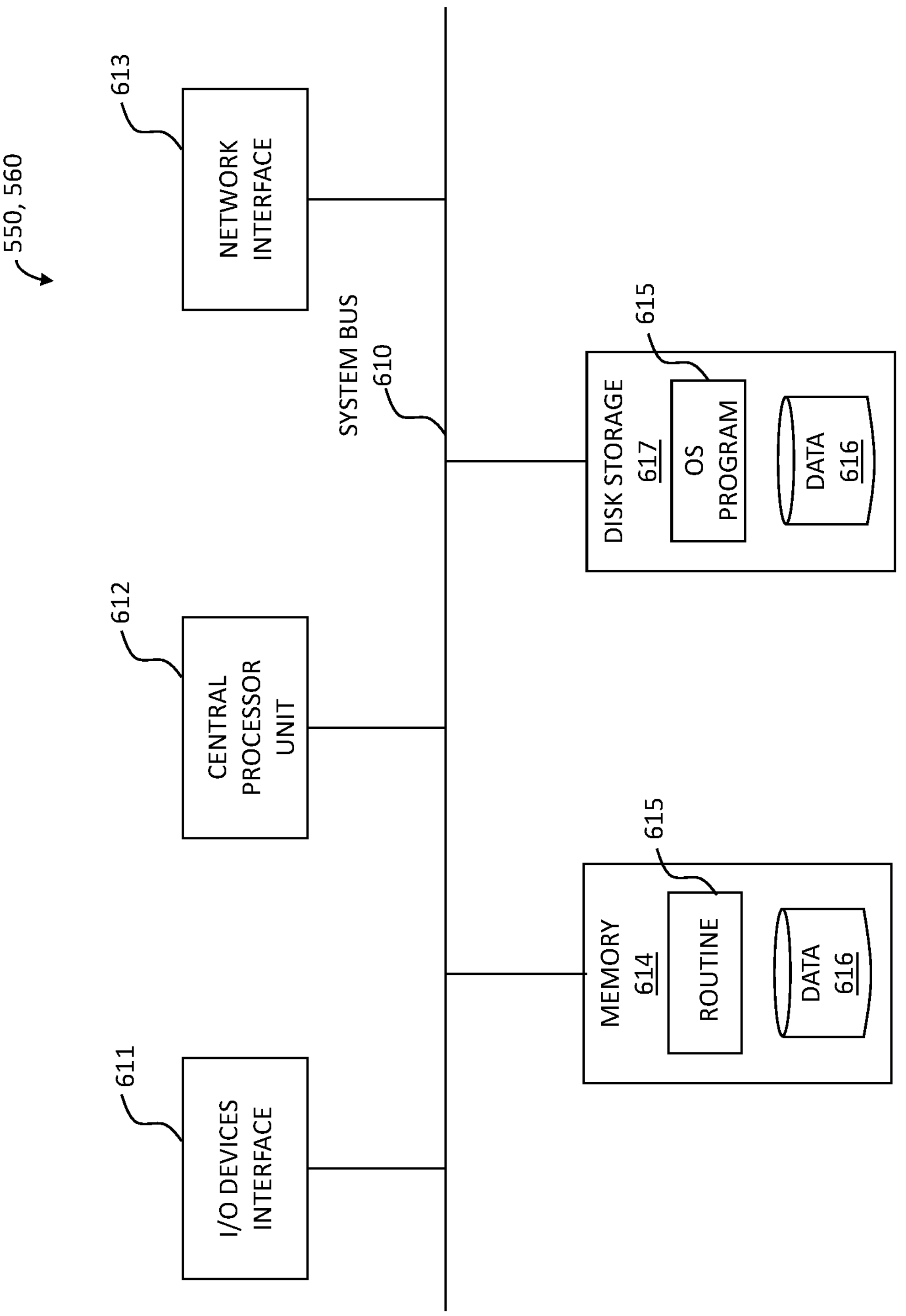
FIG. 6 is a block diagram of any internal structure of a computer/computing node in a processing environment of an embodiment.

The client computer(s)/device(s) 550 may be linked 590 directly or through communications network(s) $\mathbf{570}_{1\text{-}n}$ to other computing devices, including other client computer(s)/device(s) 550 and server computer(s)/device(s) 560. Referring to FIGS. 5 and 6 (the latter described in more detail hereinbelow), the network(s) $\mathbf{570}_{1\text{-}n}$ utilize a multi-network digital asset control system 100 (FIG. 1) according to an example embodiment, to manage digital assets across multiple networks. The multinetwork digital asset control system 100 passes messages via a protocol from one network $\mathbf{570}_{1\text{-}n}$ to another, rather than passing the digital asset 130 (FIG. 1) itself. Each of the respective network(s) $\mathbf{570}_{1\text{-}n}$ contains a copy of the respective digital asset, where the digital asset requires a cryptographic key to be unlocked and accessed. Instead of passing the digital asset across multiple networks, the multinetwork digital asset control system 100 transfers a cryptographic key to requesting users.

The communication network 570 may be part of a wireless or wired network, a remote access network, a global network (e.g., the Internet), a worldwide collection of computers, local area networks (LANs) or wide area networks (WANs), and gateways, routers, and switches that may use a variety of known protocols (e.g., TCP/IP, Bluetooth®, etc.) to communicate with one another. Moreover, the communication network 570 may also be a virtual private network (VPN) or an out-of-band (OOB) network or both. In addition, the communication network 570 may take a variety of forms, including, but not limited to, a blockchain network, a distributed ledger network, a data network, voice network (e.g., landline, mobile, etc.), audio network, video network, satellite network, radio network, and pager network. Other known electronic device/computer network architectures are also suitable. For example, the client computer(s)/device(s) 550 may include the nodes shown in FIG. 3, which may run user applications that enable a user to communicate with an application to determine whether a user meets a work requirement. A blockchain network (e.g., the computer networks 102*a-n* of FIG. 1, which may be configured as blockchain computer networks) may be configured on each user device 310, 320 (FIG. 3) to store tokens. The client computers 350 (FIG. 3) of the system 100 (FIG. 1) or the computer-based system/method 900 (FIG. 9) may be configured with a trusted execution environment (TEE) or TPM, where the application may be run and digital assets and/or tokens may be stored.

Referring again to FIG. 5, the server computer(s)/device(s) 560 of the system 100 or the computer-based system/method 900 may be configured to include a server that that executes an application. For example, the application of server computer(s)/device(s) 560 may be configured to provide a multinetwork digital asset control system 100 that verifies, records, retrieves, and distributes a cryptographic key, e.g., the cryptographic key 140 (FIG. 1), used to secure and unlock a digital asset, e.g., the digital asset 130 (FIG. 1). The server computer(s)/device(s) 560 may not be separate server computers, but instead may be part of a cloud service. For another example, the server computer(s)/device(s) 560 or the client computer(s)/device(s) 550 may include the peer computing devices (nodes) 310, 320, 330, 340, 350, 360 of the distributed blockchain ledger 300 of FIG. 3, which use smart contracts to execute and record transactions implemented via tokens.

FIG. 6 is a block diagram of any internal structure of a computing/processing node (e.g., the client computer(s)/device(s) 550 or server computer(s)/device(s) 560) in the processing environment 500 of FIG. 5, which may be used to facilitate displaying audio, image, video, and/or data signal information. Each computer/device 550, 560 in FIG. 6 may contain a system bus 610, where a bus is a set of actual or virtual hardware lines used for data transfer among components of a computer or processing system. The system bus 610 may essentially be a shared conduit that connects different elements of a computer system (e.g., processor, disk storage, memory, I/O ports, etc.), thereby enabling transfer of data between elements or components.

Figure 9:
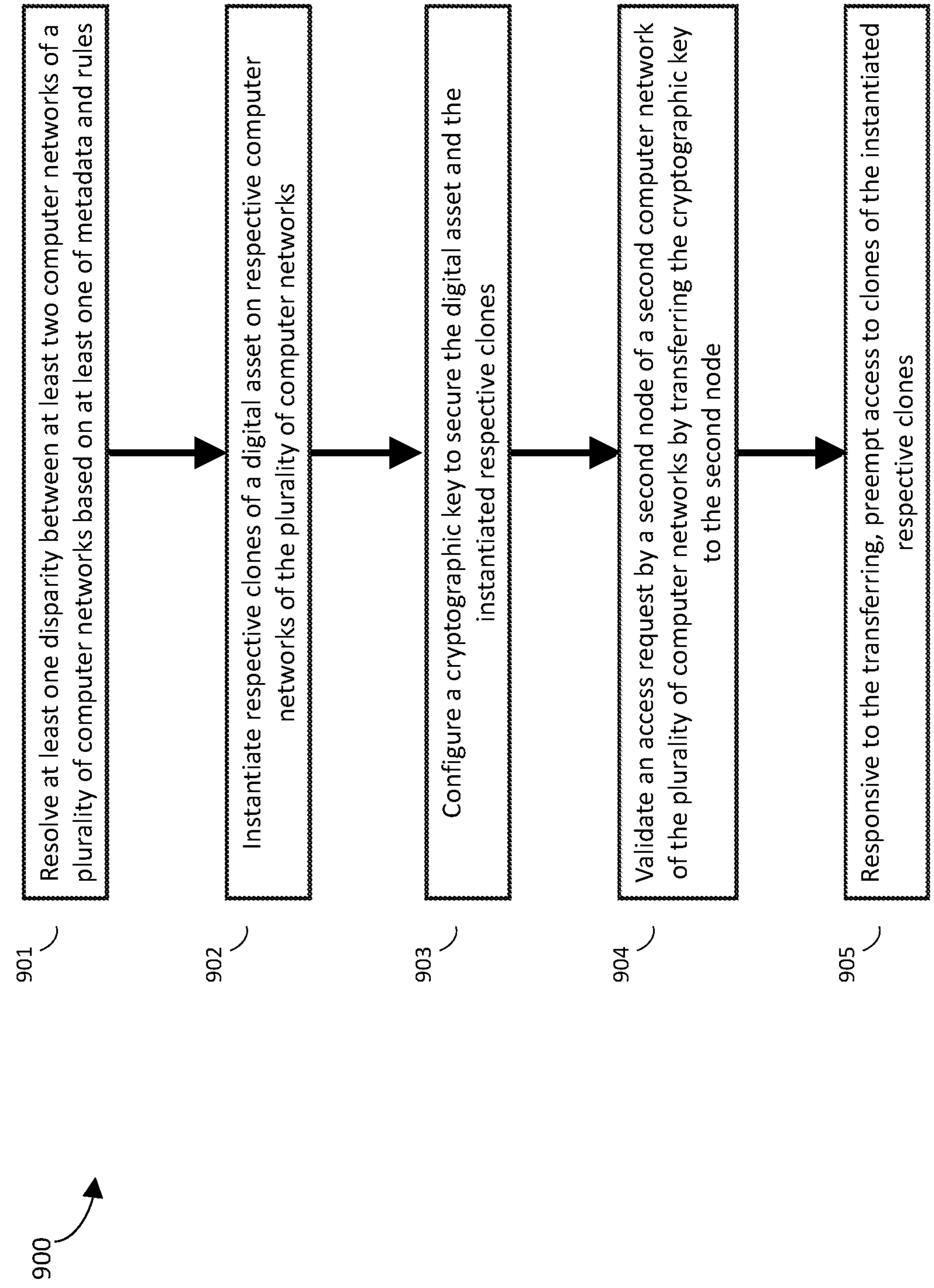
FIG. 9 is a flow diagram of an exemplary computer-based system/method for multinetwork digital asset control according to an embodiment.

Continuing with FIG. 6, attached to the system bus 610 is an I/O device interface 611 for connecting various input and output devices (e.g., keyboard, mouse, touch screen interface, displays, printers, speakers, audio inputs and outputs, video inputs and outputs, microphone jacks, etc.) to a computer/device 550, 560. A network interface 613 may allow a computer/device to connect to various other devices attached to a network, e.g., the network 570 of FIG. 5. A memory 614 may provide volatile storage for computer software instructions 615 and data 616 used in some embodiments to implement software modules/components of the system 100 (FIG. 1) or the system/method 900 (FIG. 9).

The software components 615, 616 of the system 100 or the system/method 900 (e.g., device integrity attestation and authentication software components, multinetwork digital asset controller, cross-chain wallet 704 (FIG. 7A), software components of the blockchain network 300 (FIG. 3), a minimax recursive algorithm, TPM/TEE, blockchain Layer 1 VM, encoder/decoder, arbiter, oracle/ML oracle/VM oracle, wallet interface, applets, authentication site, cybersecurity controller, service applications, and the like) described herein may be configured using any suitable programming language known in the art, including any high-level, object-oriented programming (OOP) language, such as Python or Solidity. The computer-based system may include instances of processes that enable execution of transactions and recordation of such transactions. It should be understood that the terms "transaction" and "exchange" are herein used interchangeably, when used within a context of digitally transferring items of value, such as digital assets (e.g., the digital asset 130 of FIG. 1), collateral assets, and/or collateral tokens, among entities associated with a blockchain network, e.g., the computer networks 102*a-n* (FIG. 1), which may be configured as blockchain computer networks, or the blockchain network 300 (FIG. 3). The system 100 or the system/method 900 may also include instances of a scoring engine and/or encoders/decoders, which can be implemented by, e.g., a server 560 and/or a client 550 that communicates with the server 560, using, for example, SSL (secure sockets layer), HTTPS (Hypertext Transfer Protocol Secure), or any other suitable protocol known in the art.

In an example mobile implementation, a mobile agent implementation of embodiments may be provided. A client-server environment may be used to enable mobile services using a network server, e.g., a server 560. It may use, for example, the Extensible Messaging and Presence Protocol (XMPP) protocol, or any other suitable protocol known to those of skill in the art, to tether a device authentication engine/agent 615 on a user device 550 to a server 560. The server 560 can then issue commands to the user device 550 on request. The mobile user interface framework used to access certain components of the system 100 (FIG. 1) or the system/method 900 (FIG. 9) may be based on, e.g., XHP, Javalin, and/or WURFL (Wireless Universal Resource File), or other suitable known framework(s), interface(s), and/or combinations thereof. In another example mobile implementation for the iOS operating system (OS) and its corresponding API, the Cocoa Touch API may be used to implement the client-side components 615 using Objective-C or any other suitable known high-level OOP language that adds Smalltalk-style messaging to the C programming language.

A disk storage 617 may provide non-volatile storage for the computer software instructions 615 (equivalently "OS program") and the data 616 may be used to implement embodiments of the system 100 or the system/method 900. The system may include disk storage accessible to a server computer 560. The server computer may maintain secure access to records associated with the system/method 900. CPU (central processing unit) 612 may also be attached to the system bus 610 and provide for execution of computer instructions. In one example embodiment, the CPU 612 is a secure cryptoprocessor implemented as a dedicated microprocessor configured to execute the composable asset control system. The cryptoprocessor may be specialized to execute cryptographic algorithms within hardware to support the composable asset control system. Functions include such things as accelerating encryption algorithms that verify compliance of encoded rules related to an NFT asset, enhanced tamper, and intrusion detection, enhanced data, key protection and security enhanced memory access and I/O to facilitate transactions across multiple blockchain systems.

In some embodiments, the processor routines 615 and the data 616 may be computer program products. For example, aspects of the system 100 or the system/method 900 may include both server-side and client-side components.

In other embodiments, authenticators/attesters may be contacted via, e.g., instant messaging applications, video conferencing systems, VoIP (voice over IP) systems, email systems, etc., all of which may be implemented, at least in part, in the software 615, 616. Further, in yet other embodiments, an authentication engine/agent interfacing with the system 100 or the system/method 900 may be implemented as an API, executable software component, and/or integrated component of the OS configured to authenticate users on a TPM executing on a client device 550.

In one embodiment, an example multinetwork digital asset control system is implemented as an embedded VM, preferably executing on one or more cryptoprocessors configured to support efficient and scalable processing of application-to-blockchain and blockchain-to-blockchain transactions. The cryptoprocessor may be a dedicated computer-on-a-chip or microprocessor for carrying out cryptographic transaction operations, embedded in a hardware security module (HSM) with security measures providing failsafe tamper resistance. The embedded cryptographic processor can be configured to output decrypted data onto a bus in a secure environment, in that embedded cryptoprocessor does not output decrypted data or decrypted program instructions in an environment where security cannot be maintained. The embedded cryptoprocessor does not reveal keys or executable instructions on a bus, except in encrypted form, and zeros keys by attempts at probing or scanning.

According to an example embodiment, the software implementations 615, 616 are computer program products, e.g., an application and smart contracts (generally referenced as 615), including a computer-readable medium capable of being stored on the storage device 617, which provides at least a portion of the software instructions for the system 100 or the computer-based system/method 900. Executing instances of respective software components of the system 100 or the system/method 900, such as instances of the application and/or smart contracts, may be implemented as computer program products 615, and may be installed by any suitable software installation procedure, as is well known in the art. In another embodiment, at least a portion of the system software instructions 615 may be downloaded over a wired and/or wireless connection via, for example, a browser SSL session or through an app (whether executed from a mobile or other computing device). In other embodiments, the system 100 or the system/method 900 software components 615 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s) known in the art). Such carrier medium or signals may provide at least a portion of the software instructions for the system 100 or the computer-based system/method 900.

An example embodiment includes device code executed in a TEE or TPM. A TEE or TPM is a hardware environment that runs instructions and stores data outside a main OS of a device. This protects sensitive code and data from malware or snooping with purpose-built hardware governed by an ecosystem of endorsements, beginning with a device manufacturer. The system may perform checks on the TEE or TPM, such as executing BIOS (Basic I/O System) checks, to verify that folders (e.g., wallets) stored in the TEE/TPM have not been altered by malicious actors.

Figure 7A:
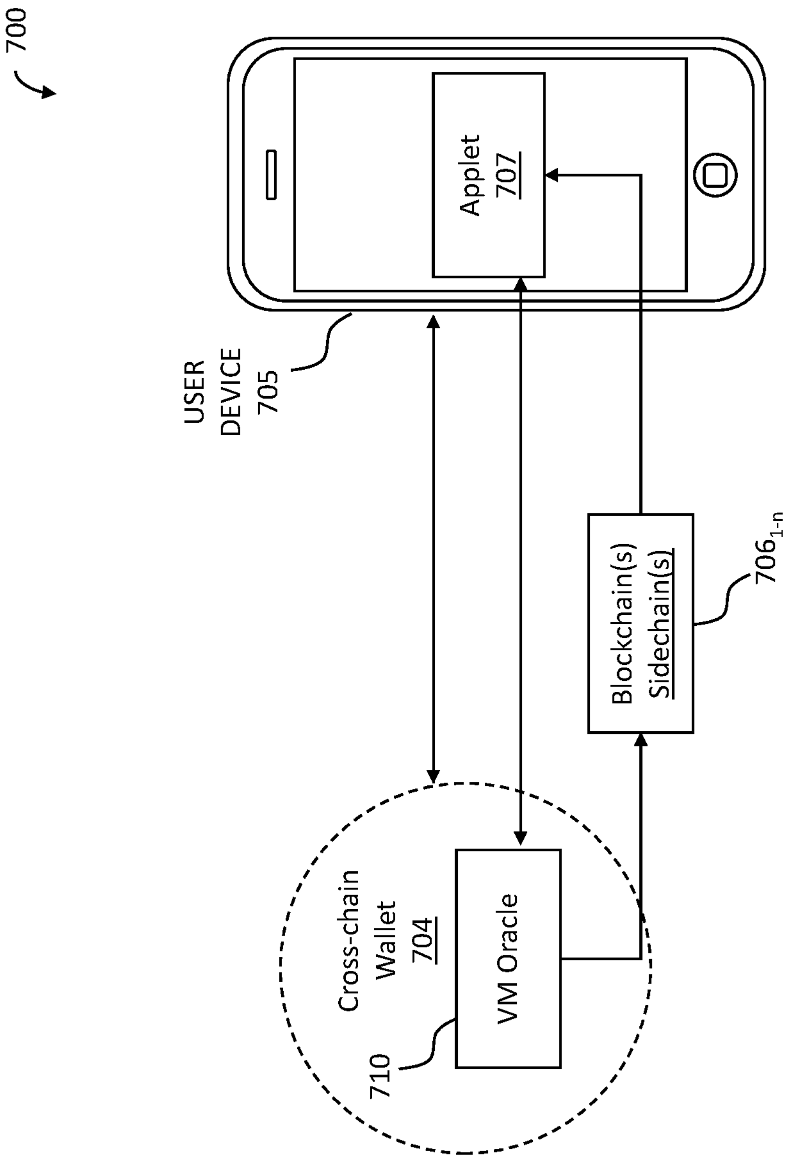
FIG. 7A is a block diagram showing an example device authentication system according to an embodiment.
Figure 7B:
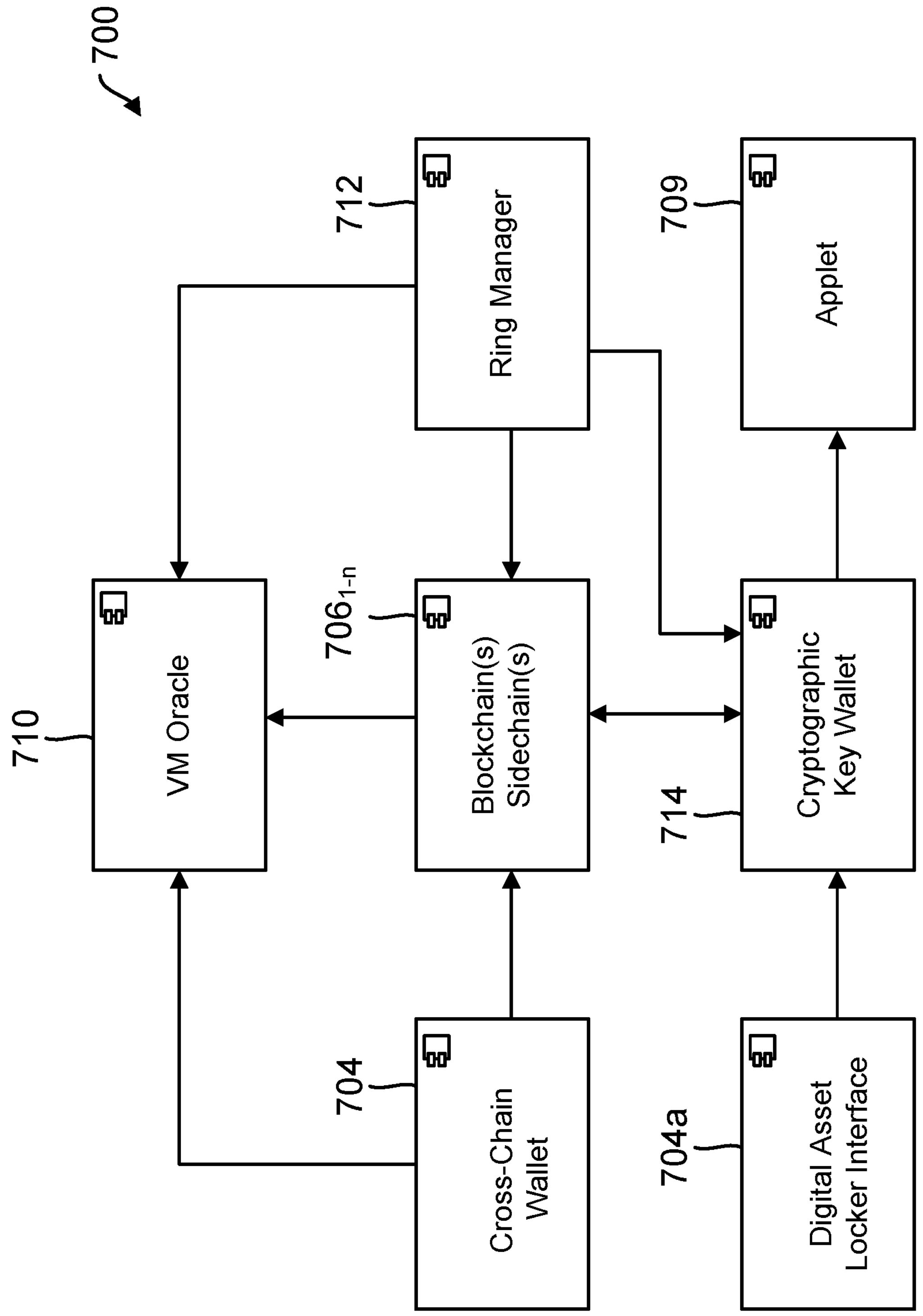
FIG. 7B is a diagram showing example system components for the example authentication system according to an embodiment.

FIG. 7A is a block diagram showing an example device authentication system 700 with components upon which the system 100 or the computer-based system/method 900 may operate according to an embodiment. With these system components 700, network nodes can make use of hardened encryption and a cryptographic key in endpoint user device(s) 705 through an API 704*a* (FIG. 7B) to the digital asset locker and cross-chain wallet 704. The user device(s) 705 may provide processing, storage, and I/O devices executing application programs and the like. In addition, further services may be provided built on these system components 700 for device management, backup, attestation, etc. To support the system 100 or the computer-based system/method 900, registration of identity cryptographic keys and a set of device management services for attestation, backup, and device grouping, are managed. The system components 700, e.g., cryptographic key wallet 714 (FIG. 7B), may also interface with an applet 709 (FIG. 7B).

It would be the intent of the system 700 not to maintain mission critical data as in conventional approaches, but rather to provide a platform for seamless, yet secure, connections between the cross-chain wallet 704 and the user device(s) 705. On one end of the system is a VM oracle 710 (e.g., an embedded VM oracle) that prepares an instruction for a user device 705 and at the other is the multinetwork digital asset control system, which is applet 707 that can act on that instruction. A protocol may define how these instructions and replies are constructed.

According to an example embodiment, the system 700 may illustrate binding between physical and digital assets. In another example embodiment, the system 700 may lock features of identity, transaction, and attestation to hardware of the respective user device(s) 705. Further, in yet another example embodiment, the system 700 may provide a ZKP attestation that a node implementing the multinetwork digital asset control system minted a collateral token configured to consolidate liquidity within a blockchain protocol for an exchange of a digital asset. In this way, the attestation can improve processing time of a given exchange transaction by allowing the system 700 to approve an exchange if the exchange is performed on or facilitated by the node, thereby ensuring that the exchange is secure and that the multinetwork digital asset control system provides liquidity to support the exchange of the digital asset.

In an example embodiment, the system 700 may leverage ZKP attestation(s) in cross-chain transaction(s) to help enable control and tracking of digital asset(s) across multiple or different blockchains. Controlling a digital asset, e.g., a token, such as a NFT, may include configuring ZKP attestation(s) to secure the digital asset and instantiated respective clones of the digital asset. These proofs may enable access control for the digital asset and any corresponding clones without revealing transaction details, such as a sender and/or recipient, among other examples. Doing so enhances the privacy and scalability of blockchain networks, as well as of the digital asset, if and when it is subject to a cross-chain transaction or transfer.

According to another example embodiment, the system 700 may be configured to resolve disparity(ies) between two or more computer networks of a plurality of computer networks based on metadata and/or rules, e.g., predefined rules. The system 700 may be further configured to use ZKP(s), e.g., ZKP attestation(s), to validate access to the digital asset across the plurality of computer networks. Controlling the digital asset may include instantiating respective clones of the digital asset on respective computer networks of the plurality of computer networks.

Further, in yet another example embodiment, controlling the digital asset may include generating and/or configuring ZKP(s), e.g., ZKP attestation(s), to secure the digital asset and instantiated respective clones of the digital asset. Controlling the digital asset may further include validating, via ZKP(s), an access request by a second node, e.g., a client device or user, of a second computer network of the plurality of computer networks by verifying ZKP(s) of the second node. The access request verified using the ZKP(s) may be for the digital asset or a clone of the instantiated respective clones. Controlling the digital asset may further include, responsive to the validating, preempting access to clones of the instantiated respective clones based on a failure or absence of a ZKP attestation by a given other node.

In an example embodiment, the multinetwork digital asset control system 700, shown in FIG. 7B, may use a secure socket, e.g., SSL or HTTPS, to maintain a persistent connection with devices. This channel may be used for pairing and other attestation functions of the multinetwork digital asset control system. The VM oracle 710 may be provided to/utilized on blockchain networks for simplifying the encoding of a transaction. This VM oracle 710, for example, could be implemented in a programming language, such as a high-level, OOP language with dynamic semantics like Python.

A TEE may be implemented in a user device hardware security chip separate execution environment that runs alongside the rich OS and provides security services to that rich environment. The cryptographic keys and/or digital assets, collateral assets, or collateral tokens may be stored in the TEE. The TEE offers an execution space that provides a higher level of security than a rich OS. The TEE may be implemented as a VM, on the user devices, and/or on the network nodes.

A ring manager 712 can be implemented as a service provided to end-users for managing rings (or clusters) to provide scalable execution and cross-chain deployment of multinetwork digital asset control system(s) 704 across multiple blockchain systems. The multinetwork digital asset control system(s) 704 may be grouped into a single identity and used to backup and endorse each other. Rings may be associated with other rings to create a network of devices including any oracles. The rings may be a collection of individual device public keys (as opposed to a new key). If there are not many shared devices in the network, the list of devices may be short because of the potential for increased computational and bandwidth resources that may expended, and may introduce a time cost for encrypting a transaction with all of the cryptographic keys on a device list. According to an example embodiment, the ring manager 712 may be configured to computationally pair respective clones of a digital asset, e.g., the clones 112*a-n* (FIG. 1) of the digital asset 130 (FIG. 1), with respective computer networks, e.g., the computer networks 102*a-n* (FIG. 1) or the computer-based system/method 900 (FIG. 9).

In an example embodiment, a device TEE 708 is a software program that executes in a hardware secured TEE. The device TEE 708 is specially designed to execute cryptographic functions without compromise from malware or even the device operator. Another component, cryptographic key registrar 721, is a service that registers a device into the blockchain(s)/sidechain(s) $\mathbf{706}_{1\text{-}n}$. The blockchain(s)/sidechain(s) $\mathbf{706}_{1\text{-}n}$ may be used both to store device registration and attributes and to execute/encode transactions. There may be multiple distinct blockchains forming a ring, or cluster, which may all contain users with a cryptographic key allowing them to access the common cross-chain wallet 704. Further, the cross-chain wallet 704 provides robust fraud protection by only allowing access to the cross-chain wallet 704 by users possessing a valid cryptographic key. OEM (Original Equipment Manufacturer) 723 is the entity that built the user device and/or a Trusted Application Manager (TAM) authorized to cryptographically vouch for the provenance of the device.

Figure 7C:
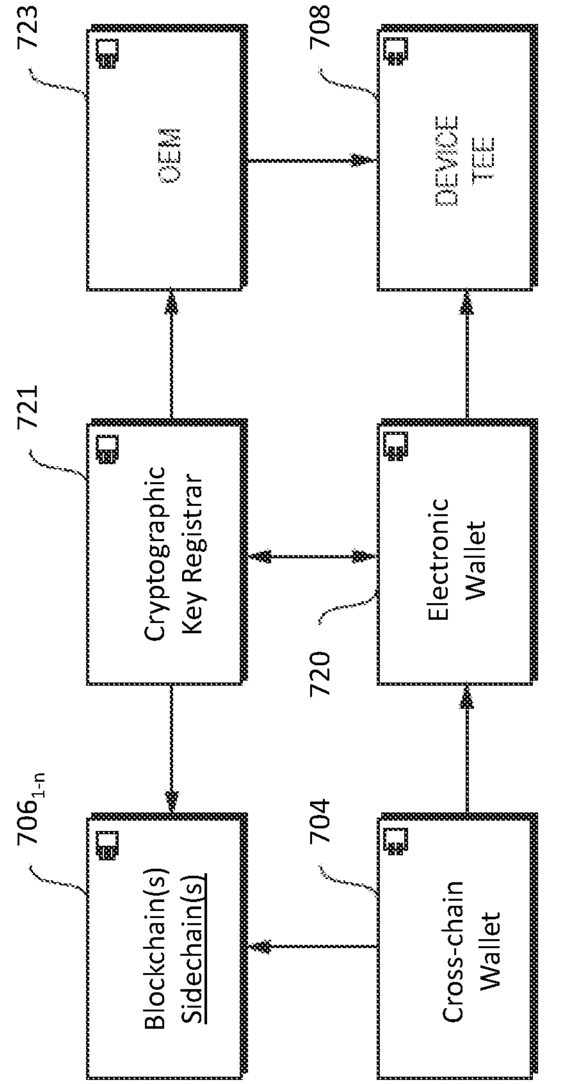
FIG. 7C is a diagram of an example device authentication system coupled with the example system components according to an embodiment.

In an example embodiment, when the electronic wallet 720 software shown in FIG. 7C runs for the first time to process an NFT, it will ask device TEE 708 to generate a cryptographic key. Each digital asset may be signed by a node that deposits the asset into a locker with their signature and is thereby locked. For a node to then interact with the asset on the network on which it is locked, the node must unlock the asset with a cryptographic signature. Registration may involve confirmation from the device operator. The registrar may ask the device for a Device Measurement Record, which may include one or more of the following: a composite value of the Platform Configuration Registers (PCRs) generated by the boot process, BIOS version, OS version, and/or GPS (Global Positioning System) location, etc. This data may be signed by the cryptographic key. It may be further signed by the registrar. The resulting data set may become the gold reference or reference value for future integrity checks. Confirmation from the device operator may be required in collecting the gold reference or reference value. This data set may be posted into a public cryptographic ledger. The public record may establish cryptographic proof of the time of registration along with the endorsement of the registrar. The registration may further include attribute data, such as location, company name, and/or device make/model. The registration may reference a signed document that sets out the policy terms of the registrar at the time of registration. The cryptographic key registrar 721, or another trusted integrity server, may create a blockchain account key (e.g., a public/private key pair) that can be referenced as a signatory in a multisignature transaction on the blockchain. With a signatory, the value represented in the blockchain transaction cannot be spent or transferred unless cosigned by the registrar.

The blockchain(s)/sidechain(s) 706$_{1-n}$ may be a JSON (JavaScript Object Notation) API written in Python, which uses the third-party agent/process private key to enroll the identity cryptographic keys of devices 705 and the multinetwork digital asset control 700. During enrollment, the public key of the user device 705 or the multinetwork digital asset control system 700 is recorded by the TEE applet 708. Enrollment enables the TEE applet 708 to pair a device 705 with a cross-chain wallet 704. In an example embodiment, the result of pairing is that a user device 705 has a service public key, endorsed by a third-party agent/process, and can therefore respond to cross-chain wallet 704 instructions.

Figure 7D:
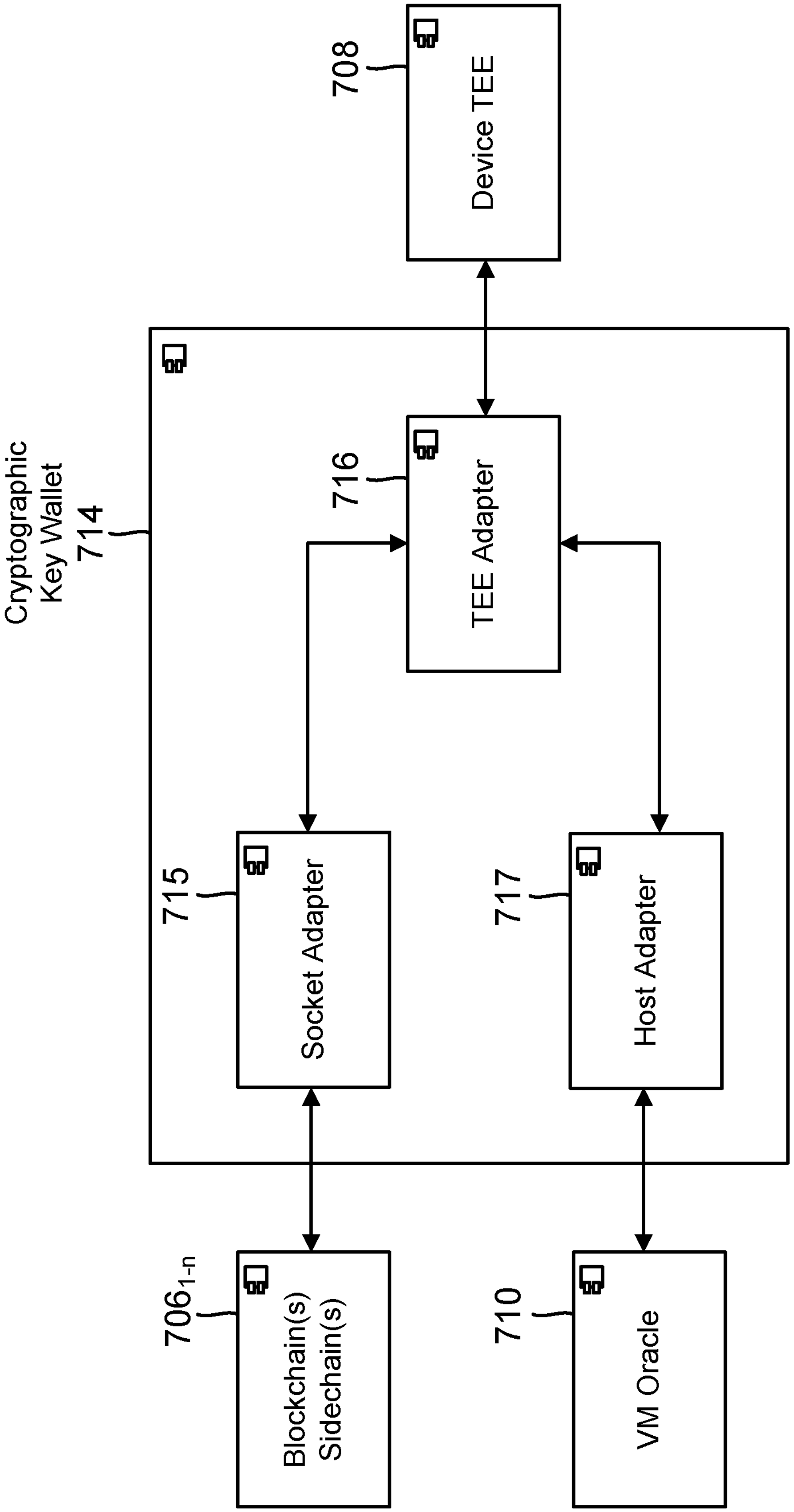
FIG. 7D is a diagram of example interfaces according to an embodiment.

In an example embodiment, the cryptographic key wallet 714 may include outward and inward-looking interfaces as shown in FIG. 7D. The inward-looking interface, the TEE adapter 716, handles proprietary communications with the multinetwork digital asset control system 700. A host adapter 717 is provided to expose services to third-party applications. The host adapter 717 may present the interface of the cryptographic key wallet 714 through different local contexts, such as browsers or system services. Multiple realizations for diverse contexts are envisioned. A socket adapter 715 may connect the client environment blockchain(s)/sidechain(s) 706$_{1-n}$. The TEE adapter 716 component may be the glue that pipes commands into the multinetwork digital asset control system 700. The cryptographic key wallet 714 may prepare message buffers that are piped to the multinetwork digital asset control system 700, and then synchronously await notification of a response event. The host adapter 717 may serve primarily to isolate the TEE adapter 716 from the host environment. The host adapter 717 may operate in a potentially hostile environment. The host adapter 717's role may serve primarily to facilitate easy access to the multinetwork digital asset control system 700. Instructions from a cross-chain wallet 704 intended for the multinetwork digital asset control system 700 may be signed by the cross-chain wallet 704 and then passed through to the TEE adapter 716 and the multinetwork digital asset control system 700.

The blockchain(s)/sidechain(s) 706$_{1-n}$ may have a special capability of pairing additional digital asset lockers with a cross-chain wallet. Communications with the first blockchain(s)/sidechain(s) 706$_{1-n}$ may be handled through the web API and may be authenticated. In an example embodiment, this may be implemented with an API key. This may be implemented using an SSL key swap. In some embodiments, all requests may be signed.

The multinetwork digital asset control system 700 provides robust security. The digital locker can be used to make it more difficult for an attacker to access the digital asset in the digital asset locker, as if the attacker does not possess a valid cryptographic key, access to the locker will not be verified. Furthermore, the system 700 may be preferably in near constant contact with all the devices 705 through the socket adapter 715 shown in FIG. 7D.

In an example embodiment, the blockchain(s)/sidechain(s) 706$_{1-n}$ may include several subcomponents. For instance, each block on the blockchain(s)/sidechain(s) 706$_{1-n}$ may contain hashes, a height, a nonce value, confirmations, and/or a Merkle Root, among other examples.

In another example embodiment, the multinetwork digital asset control system 700 may be configured to interface with the VM oracle 710. According to an example embodiment, the multinetwork digital asset control component may interface with or be coupled with the VM oracle 710. A request or instruction, e.g., from a cross-chain wallet 704 or a user device 705, to access a subject digital asset (e.g., a NFT), or a clone thereof, may trigger a cryptographic key command to be executed by associated device(s). The command may be signed and/or encrypted by the message multinetwork digital asset control system 700. The cryptographic keys from the respective devices may be preloaded into the multinetwork digital asset control system during a pairing process, which may be conducted by the blockchain(s)/sidechain(s) 706$_{1-n}$. This may allow the multinetwork digital asset control system 700 to validate an origin or source of the request, and, if needed, decrypt the contents of the instruction, and request that the other devices having cryptographic keys approve or authorize it. A quorum of cryptographic keys or all the cryptographic keys may be needed to execute a transaction related to the electronic asset (e.g., a NFT).

Figure 8A:
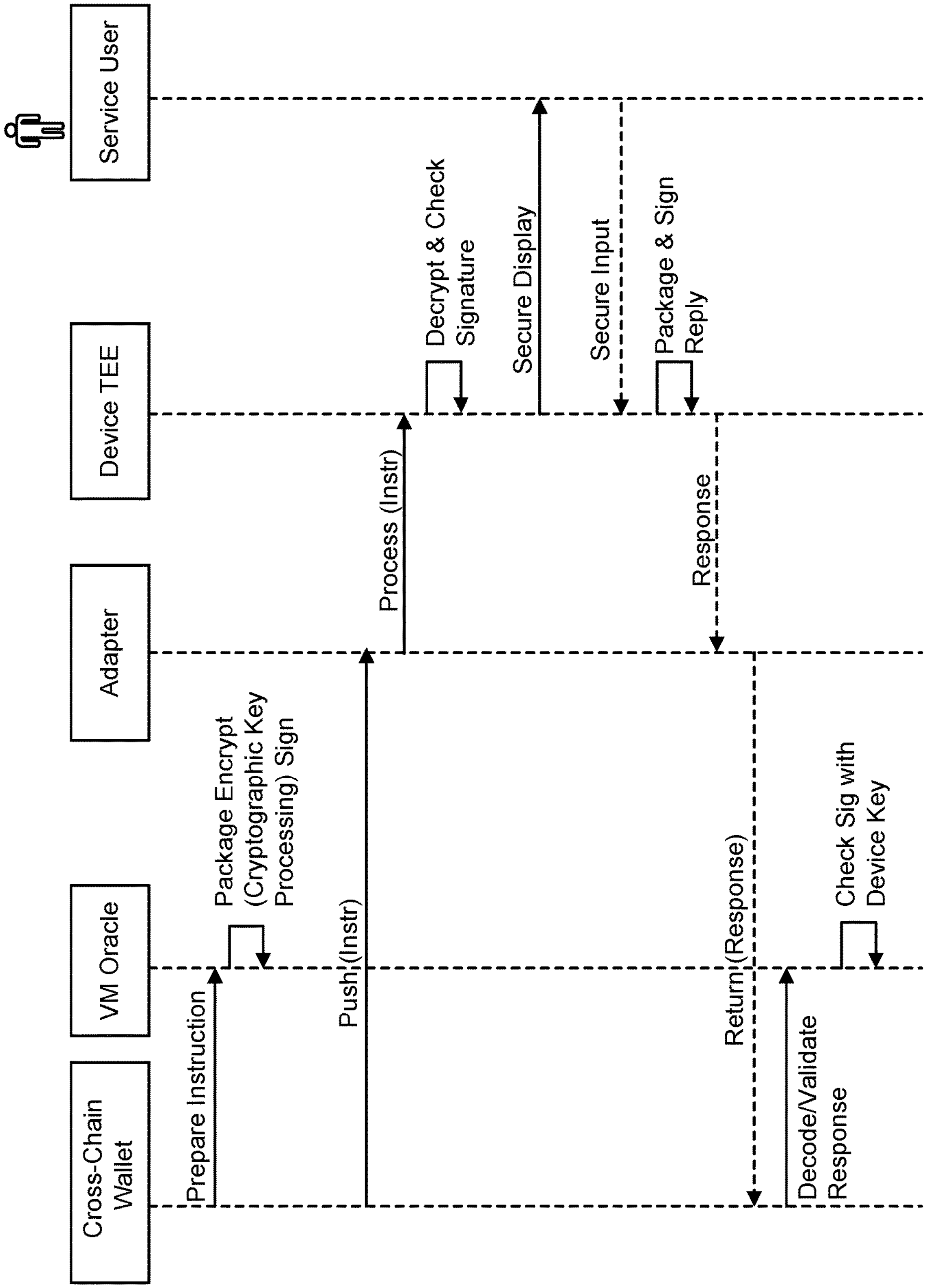
FIG. 8A is a diagram of an example sequence of packaging and delivering an instruction by an encoder according to an embodiment.

In an example embodiment, a sequence of packaging and delivering an instruction is shown in FIG. 8A. The cross-chain wallet 704 generates an instruction record with the help of the VM oracle 710 libraries. The instruction may include a type, a target device, and/or payload. The instruction may be encoded with the cryptographic key and must be signed by the cryptographic key. The cryptographic key is fetched from the blockchain(s)/sidechain(s) 706$_{1-n}$ by looking up the device registration record.

Figure 8B:
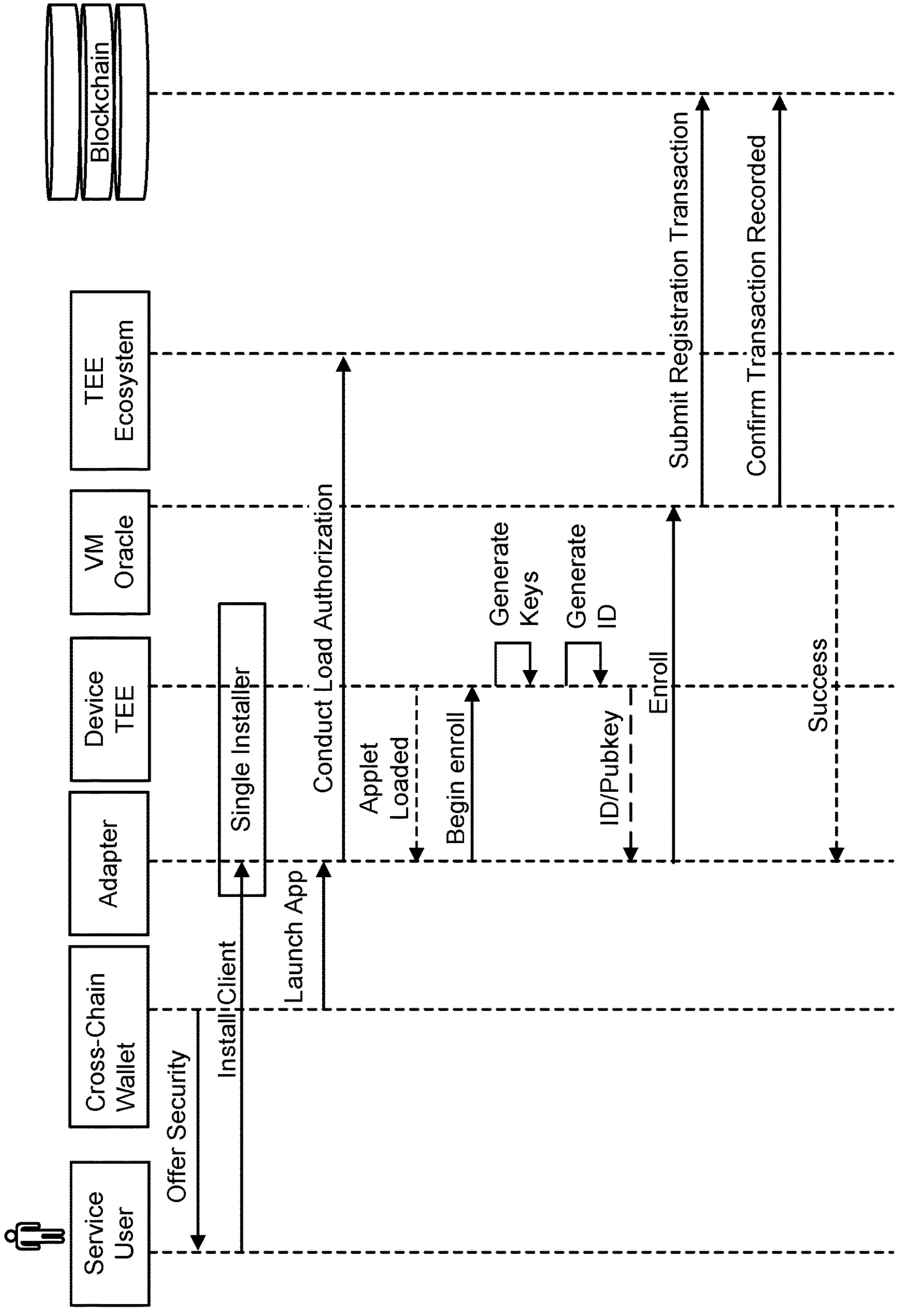
FIG. 8B is a diagram of an example device enrollment process according to an embodiment.

In another example embodiment, device enrollment or creation of a cryptographic key stored in a TEE of a device may be performed. The example enrollment process, shown in FIG. 8B, should be hassle free, or even transparent to the user. This example embodiment may ensure that the cryptographic key processed via the multinetwork digital asset control system is operating in a proper TEE.

In an embodiment of FIG. 7C, when the electronic wallet 720 software runs for the first time, it will ask the device TEE 708 to generate a cryptographic key. A hash of the cryptographic key may be registered by the cryptographic key registrar 721. The cryptographic key registrar 721 may also obtain additional information to verify the device, such as one or more of the following: a composite value of the PCRs generated by the boot process, BIOS version, OS version, GPS location, BIOS identifier, a network interface identifier, attributes about the device, such as number of files, size of files, directories, indexes, and data/search tree structures, processor identifying number of the device, or other such information. This data is signed by the device private key and may be further signed by the cryptographic key registrar 721. The cryptographic key registrar 721, or another trusted cryptographic key verification integrity server, creates a blockchain account key (a public/private key pair) that can be referenced as a signatory in a transaction on the blockchain.

FIG. 9 is a flow diagram of an exemplary computer-based system/method 900 for multinetwork digital asset control according to an embodiment. The system/method 900 begins by resolving 901 disparity(ies) between two or more computer networks, e.g., the disparity 120 (FIG. 1) between computer networks 102*b* (FIG. 1) and 102*n* (FIG. 1), of a plurality of computer networks, e.g., the computer networks 102*a-n* (FIG. 1), based on metadata and/or rules, e.g., the metadata 106 (FIG. 1) and/or the rules 108 (FIG. 1). The system/method 900 continues by controlling or tracking a digital asset, e.g., the digital asset 130 (FIG. 1), across the plurality of computer networks. Controlling the digital asset may include instantiating 902 respective clones, e.g., the clones 112*a-n* (FIG. 1), of the digital asset on respective computer networks of the plurality of computer networks. Controlling the digital asset may further include configuring 903 a cryptographic key, e.g., the cryptographic key 140 (FIG. 1), to secure the digital asset and the instantiated 902 respective clones. Controlling the digital asset may further include validating 904 an access request, e.g., the access request 150 (FIG. 1), by a second node of a second computer network, e.g., the second node 104*b*1 (FIG. 1) of the second computer network 102*b*, of the plurality of computer networks by transferring the cryptographic key to the second node. The access request may be for the digital asset or a clone of the instantiated 902 respective clones. Controlling the digital asset may further include, responsive to the transferring 904, preempting 905 access to clones of the instantiated 902 respective clones. The clones may be instantiated 902 on computer networks of the plurality of computer networks different from the second computer network. As shown in FIG. 9, the system/method 900 may thereby control the digital asset across the plurality of computer networks.

Further example embodiments disclosed herein may be configured using a computer program product; for example, controls may be programmed in software for implementing example embodiments. Further example embodiments may include a non-transitory computer-readable medium containing instructions that may be executed by a processor which, when loaded and executed, cause the processor to complete methods described herein. It should be understood that elements of the block and flow diagrams may be implemented in software or hardware, such as via one or more arrangements of circuitry of FIG. 6, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random-access memory (RAM), read-only memory (ROM), compact disk read-only memory (CD-ROM), and so forth. In operation, a general-purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

It should be understood that the term "blockchain" as used herein includes all forms of electronic, computer-based distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

It should also be noted that not all currently known distributed ledger systems utilize linear blockchains as such. Some known blockchain implementations utilize lattice or mesh data structure(s), and some utilize directed acyclic graphs (DAGs).

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-based system for multinetwork digital asset control, the computer-based system comprising:

a plurality of computer networks, each of the plurality of computer networks having a respective plurality of nodes, a first node of a first computer network of the plurality of computer networks being configured to execute a multinetwork digital asset control system, the multinetwork digital asset control system being configured to resolve at least one disparity between at least two computer networks of the plurality of computer networks based on at least one of metadata and rules, the multinetwork digital asset control system being further configured to:

instantiate respective clones of a digital asset on respective computer networks of the plurality of computer networks;

implement an asset mirror oracle system spanning the plurality of computer networks;

configure the asset mirror oracle system with a cryptographic key to enforce exclusive access to the digital asset and the instantiated respective clones;

perform a validation of an access request by a second node of a second computer network of the plurality of computer networks, the access request being for the a given clone of the instantiated respective clones; and responsive to the validation indicating that the second node is authorized to access the given clone, transfer the cryptographic key to the second node;

wherein the transfer is configured to automatically preempt access to other clones of the instantiated respective clones, the other clones being different from the given clone and instantiated on computer networks of the plurality of computer networks different from the second computer network, thereby controlling exclusive access to the clones of the digital asset across the plurality of computer networks.

2. The computer-based system of claim 1, wherein the digital asset is configured as a non-fungible token (NFT).

3. The computer-based system of claim 2, wherein the non-fungible token (NFT) is configured with at least one of: an indication of an owner, one or more status flags, and an ERC-721 interface.

4. The computer-based system of claim 1, wherein the multinetwork digital asset control system is further configured to:

resolve a disparity of the at least one disparity between the at least two computer networks, the disparity including at least one of: (i) an exchange value of the digital asset, (ii) an exchange cost associated with the digital asset, (iii) another exchange parameter associated with the digital asset, (iv) an environment of use for the digital asset, the environment of use belonging to a given computer network of the at least two computer networks, and (v) a combination thereof.

5. The computer-based system of claim 4, wherein the environment of use includes an online gaming environment, and wherein the multinetwork digital asset control system is further configured to:

validate a request to perform an action upon the digital asset in the online gaming environment;

preempt performance of the action in computer networks of the plurality of computer networks different from the given computer network; and preempt performance of the action in environments of the given computer network different from the online gaming environment.

6. The computer-based system of claim 1, wherein the multinetwork digital asset control system is further configured to:

ascertain at least one security vulnerability pertaining to the digital asset on a given computer network of the plurality of computer networks.

7. The computer-based system of claim 1, wherein the multinetwork digital asset control system is further configured to:

configure a first clone of the instantiated respective clones to enforce a rule pertaining to a second clone of the instantiated respective clones, the first clone belonging to a given computer network of the plurality of computer networks, the second clone belonging to a given other computer network of the plurality of computer networks.

8. The computer-based system of claim 1, wherein at least one rule of the rules is configured to:

computationally assign permissions to a given node of a given computer network of the plurality of computer networks, the permissions configured to unlock, using a zero-knowledge proof (ZKP), a given clone of the instantiated respective clones, the given clone belonging to the given network.

9. The computer-based system of claim 1, wherein the multinetwork digital asset control system is further configured to:

implement a multiparty computation (MPC) security system, the multiparty computation (MPC) security system configured to:

computationally process one or more key shards of the cryptographic key; and assign the computationally processed one or more key shards to one or more respective nodes, the one or more respective nodes belonging to one or more computer networks of the plurality of computer networks.

10. The computer-based system of claim 1, further comprising a virtual machine (VM) embedded oracle configured to enforce at least one rule of the rules.

11. The computer-based system of claim 9, wherein:

the first node includes a secure cryptoprocessor implemented as a dedicated microprocessor configured to execute the multiparty computation (MPC) security system; and the multinetwork digital asset control system is embedded on the secure cryptoprocessor.

12. The computer-based system of claim 1, wherein the multinetwork digital asset control system is further configured to:

computationally pair respective cryptographic keys with respective nodes of the plurality of computer networks;

validate, based on the computationally paired respective cryptographic keys, and source of an access instruction, the access instruction (i) received from a given node of the respective nodes and (ii) pertaining to the digital asset or a clone of the instantiated respective clones; and verify the access instruction based on a computational authorization received from one or more other nodes of the respective nodes, the one or more other nodes being different from the given node.

13. The computer-based system of claim 12, wherein the access instruction is an encrypted access instruction, and wherein the multinetwork digital asset control system is further configured to:

decrypt the encrypted access instruction.

14. The computer-based system of claim 12, wherein the multinetwork digital asset control system is further configured to:

interface with a virtual machine (VM) embedded oracle; and receive, via the virtual machine (VM) embedded oracle, at least one of the access instruction and the computational authorization.

15. A computer-implemented method for multinetwork digital asset control, the computer-implemented method comprising:

resolving at least one disparity between at least two computer networks of a plurality of computer networks based on at least one of metadata and rules; and controlling a digital asset across the plurality of computer networks by:

instantiating respective clones of the digital asset on respective computer networks of the plurality of computer networks;

implementing an asset mirror oracle system spanning the plurality of computer networks;

configuring the asset mirror oracle system with a cryptographic key to enforce exclusive access to the digital asset and the instantiated respective clones;

performing a validation of an access request by a second node of a second computer network of the plurality of computer networks, the access request being for a given clone of the instantiated respective clones; and responsive to the validation indicating that the second node is authorized to access the given clone, transferring the cryptographic key to the second node;

wherein the transferring includes automatically preempting access to other clones of the instantiated respective clones, the other clones being different from the given clone and instantiated on computer networks of the plurality of computer networks different from the second computer network, thereby controlling exclusive access to the clones of the digital asset across the plurality of computer networks.

16. The computer-implemented method of claim 15, further comprising:

configuring the digital asset as a non-fungible token (NFT).

17. The computer-implemented method of claim 16, further comprising:

configuring the non-fungible token (NFT) with at least one of: an indication of an owner, one or more status flags, and an ERC-721 interface.

18. The computer-implemented method of claim 15, further comprising:

resolving a disparity of the at least one disparity between the at least two computer networks, the disparity including at least one of: (i) an exchange value of the digital asset, (ii) an exchange cost associated with the digital asset, (iii) another exchange parameter associated with the digital asset, (iv) an environment of use for the digital asset, the environment of use belonging to a given computer network of the at least two computer networks, and (v) a combination thereof.

19. The computer-implemented method of claim 18, wherein the environment of use includes an online gaming environment, and further comprising:

validating a request to perform an action upon the digital asset in the online gaming environment;

preempting performance of the action in computer networks of the plurality of computer networks different from the given computer network; and preempting performance of the action in environments of the given computer network different from the online gaming environment.

20. The computer-implemented method of claim 15, further comprising:

ascertaining at least one security vulnerability pertaining to the digital asset on a given computer network of the plurality of computer networks.

21. The computer-implemented method of claim 15, further comprising:

configuring a first clone of the instantiated respective clones to enforce a rule pertaining to a second clone of the instantiated respective clones, the first clone belonging to a given computer network of the plurality of computer networks, the second clone belonging to a given other computer network of the plurality of computer networks.

22. The computer-implemented method of claim 15, further comprising:

configuring at least one rule of the rules to computationally assign permissions to a given node of a given computer network of the plurality of computer networks, the permissions configured to unlock, using a zero-knowledge proof (ZKP), a given clone of the instantiated respective clones, the given clone belonging to the given network.

23. The computer-implemented method of claim 19, further comprising:

implementing a multiparty computation (MPC) security mechanism for the cryptographic key by:

computationally processing one or more key shards of the cryptographic key; and assigning the computationally processed one or more key shards to one or more respective nodes, the one or more respective nodes belonging to one or more computer networks of the plurality of computer networks.

24. The computer-implemented method of claim 15, further comprising:

via a virtual machine (VM) embedded oracle, enforcing at least one rule of the rules.

25. The computer-implemented method of claim 15, further comprising:

computationally pairing respective cryptographic keys with respective nodes of the plurality of computer networks;

validating, based on the computationally paired respective cryptographic keys, and source of an access instruction, the access instruction (i) received from a given node of the respective nodes and (ii) pertaining to the digital asset or a clone of the instantiated respective clones; and verifying the access instruction based on a computational authorization received from one or more other nodes of the respective nodes, the one or more other nodes being different from the given node.

26. The computer-implemented method of claim 25, wherein the access instruction is an encrypted access instruction, and further comprising:

decrypting the encrypted access instruction.

27. The computer-implemented method of claim 25, further comprising:

interfacing with a virtual machine (VM) embedded oracle; and receiving, via the virtual machine (VM) embedded oracle, at least one of the access instruction and the computational authorization.

28. A non-transitory computer program product for multi-network digital asset control, the non-transitory computer program product comprising a computer-readable medium with computer code instructions stored thereon, the computer code instructions being configured, when executed by a processor, to cause the processor to:

execute, at a first node of a first computer network of a plurality of computer networks, a multinetwork digital asset control system configured to:

resolve at least one disparity between at least two computer networks of the plurality of computer networks based on at least one of metadata and rules; and control a digital asset across the plurality of computer networks by:

instantiating respective clones of the digital asset on respective computer networks of the plurality of computer networks;

implementing an asset mirror oracle system spanning the plurality of computer networks;

configuring the asset mirror oracle system with a cryptographic key to enforce exclusive access to the digital asset and the instantiated respective clones;

performing a validation of an access request by a second node of a second computer network of the plurality of computer networks, the access request being for the a given clone of the instantiated respective clones; and responsive to the validation indicating that the second node is authorized to access the given clone, transferring the cryptographic key to the second node;

wherein the transferring includes automatically preempting access to other clones of the instantiated respective clones, the other clones being different from the given clone and instantiated on computer networks of the plurality of computer networks different from the second computer network, thereby controlling exclusive access to the clones of the digital asset across the plurality of computer networks.

* * * * *